United States Patent
Tillotson

(10) Patent No.: US 7,711,441 B2
(45) Date of Patent: May 4, 2010

(54) AIMING FEEDBACK CONTROL FOR MULTIPLE ENERGY BEAMS

(75) Inventor: Brian J Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 338 days.

(21) Appl. No.: 11/743,991

(22) Filed: May 3, 2007

(65) Prior Publication Data

US 2008/0275572 A1 Nov. 6, 2008

(51) Int. Cl.
  *H01L 31/052* (2006.01)
  *B64G 1/10* (2006.01)
  *H04B 10/00* (2006.01)
  *B64C 39/02* (2006.01)

(52) U.S. Cl. .................... 700/59; 700/57; 700/286; 398/129; 250/559.3; 136/246; 342/372; 244/1 R

(58) Field of Classification Search .................... 342/81, 342/350, 351, 352, 354, 357, 361; 359/28, 359/237; 398/202, 201; 136/246; 356/614; 340/436; 700/56, 57, 59, 286; 370/252; 250/203.1; 240/60

See application file for complete search history.

(56) References Cited

U.S. PATENT DOCUMENTS

| | | | | |
|---|---|---|---|---|
| 4,229,103 A | * | 10/1980 | Hipp | 356/141.1 |
| 4,368,415 A | * | 1/1983 | Henderson et al. | 322/2 R |
| 4,491,982 A | * | 1/1985 | Candy et al. | 398/129 |
| 4,756,617 A | * | 7/1988 | Cain et al. | 356/4.08 |
| 5,019,768 A | * | 5/1991 | Criswell et al. | 322/2 R |
| 5,068,669 A | * | 11/1991 | Koert et al. | 343/700 MS |
| 5,114,227 A | * | 5/1992 | Cleveland, Jr. | 356/139.05 |
| 5,223,781 A | * | 6/1993 | Criswell et al. | 322/2 R |
| 5,503,350 A | * | 4/1996 | Foote | 244/1 R |
| 5,623,269 A | * | 4/1997 | Hirshfield et al. | 342/354 |
| 5,777,768 A | * | 7/1998 | Korevaar | 398/129 |
| 5,907,305 A | * | 5/1999 | Epp et al. | 343/700 MS |
| 5,953,146 A | * | 9/1999 | Shelby | 398/131 |
| 5,973,310 A | * | 10/1999 | Lunscher | 250/203.1 |

(Continued)

FOREIGN PATENT DOCUMENTS

WO   WO 9702623 A1  *  1/1997

OTHER PUBLICATIONS

Brown et al, "Beamed Microwave Power Transmission and its Application to Space," IEEE Transactions on Microwave Theory and Techniques, vol. 40, No. 6, Jun. 1992, pp. 1239-1250.*

(Continued)

*Primary Examiner*—Ramesh B Patel
*Assistant Examiner*—Dave Robertson
(74) *Attorney, Agent, or Firm*—Lee & Hayes, PLLC

(57) ABSTRACT

Plural energy beam sources are aimed at an energy receiving device by way of feedback control signals. Each energy beam is uniquely modulated by way of amplitude, polarization and/or coning patterns to enable individual detection and control. Sensors detect individual energy beams incident to the energy receiving device and provide corresponding detection signals. Control electronics receive the detection signals and derive one or more control signals that are coupled to the plural energy sources. Aircraft and other vehicles are thus provided with electrical and/or thermal energy without the need for source-to-vehicle cabling or substantial on-board energy resources.

16 Claims, 11 Drawing Sheets

U.S. PATENT DOCUMENTS

| | | | | |
|---|---|---|---|---|
| 6,091,074 | A  * | 7/2000 | Korevaar | 250/559.3 |
| 6,118,131 | A  * | 9/2000 | Korevaar | 250/559.3 |
| 6,151,308 | A  * | 11/2000 | Ibanez-Meier et al. | 370/316 |
| 6,163,372 | A  * | 12/2000 | Sallee et al. | 356/5.1 |
| 6,407,535 | B1 * | 6/2002 | Friedman et al. | 322/2 R |
| 6,492,586 | B2 * | 12/2002 | Mikami et al. | 136/244 |
| 6,507,392 | B1 * | 1/2003 | Richards et al. | 356/141.5 |
| 6,556,324 | B1 * | 4/2003 | Meier | 398/129 |
| 6,727,425 | B2 * | 4/2004 | Takada et al. | 136/244 |
| 6,819,874 | B2 * | 11/2004 | Cheng et al. | 398/129 |
| 6,936,760 | B2 * | 8/2005 | Rogers et al. | 136/246 |
| 6,943,873 | B2 * | 9/2005 | Sallee | 356/141.1 |
| 7,120,363 | B2 * | 10/2006 | Andreu-von Euw et al. | 398/129 |
| 7,171,126 | B2 * | 1/2007 | Cicchiello et al. | 398/129 |
| 7,343,099 | B2 * | 3/2008 | Wirth et al. | 398/131 |
| 7,403,719 | B2 * | 7/2008 | Koontz | 398/201 |
| 7,409,161 | B2 * | 8/2008 | Watanabe | 398/130 |
| 7,413,147 | B2 * | 8/2008 | Bae | 244/164 |
| 7,423,767 | B2 * | 9/2008 | Steinsiek et al. | 356/614 |
| 7,437,077 | B2 * | 10/2008 | Wirth et al. | 398/119 |
| 2003/0067657 | A1 * | 4/2003 | Dimmler et al. | 359/159 |
| 2005/0180753 | A1 * | 8/2005 | Wirth et al. | 398/118 |
| 2005/0190427 | A1 * | 9/2005 | Steinsiek et al. | 359/237 |
| 2005/0196166 | A1 * | 9/2005 | Wirth et al. | 398/33 |

OTHER PUBLICATIONS

Adams, R., "Beam tagging for control of adaptive transmitting arrays," IEEE Transaction on Antennas and Propagation, vol. 12, No. 2, pp. 224-227, Mar. 1964.*

Benford, J., "Space Applications of High Power Microwaves," Plasma Science, 2007. ICOPS 2007. IEEE 34th International Conference on , vol., No., pp. 257-257, Jun. 17-22, 2007.*

Brown, W. C., The history of wireless power transmission. Solar Energy 56 (1996), pp. 4-12.*

Landis, G.A., "Space power by ground-based laser illumination," Aerospace and Electronic Systems Magazine, IEEE , vol. 6, No. 11, pp. 3-7, Nov. 1991.*

Brown, W.C., "Experiments Involving a Microwave Beam to Power and Position a Helicopter," Aerospace and Electronic Systems, IEEE Transactions on , vol. AES-5, No. 5, pp. 692-702, Sep. 1969.*

Landis, Geoffrey A. Applications for space power by laser transmission, Proc. SPIE 2121, 252 (1994).*

Landis, G. a., "Space Power by Ground-Based Laser Illumination," IEEE Aerospace and Electronic Systems, vol. 6, No. 6, pp. 3-8 (1991); presented at 26th Intersociety Energy Conversion Engineering Conference, Aug. 1991, Boston, MA.*

Schäfer, Christian A., Osamu Matoba, and Nobuyuki Kaya, "Optical retrodirective tracking system approach using an array of phase conjugators for communication and power transmission," Appl. Opt. 46, 4633-4641 (2007).*

Bennett, G. and Cull, Ronald C. Enabling the Space Exploration Initiative—NASA's Exploration Technology Program in space power. AIAA, NASA, and OAI, Conference on Advanced SEI Technologies, Cleveland, OH; United States; Sep. 4-6, 1991.*

Jenn, D.C., "Transmission Equation for Multiple Cooperative Transmitters and Collective Beamforming," Antennas and Wireless Propagation Letters, IEEE , vol. 7, No., pp. 606-608, 2008.*

Miller, S. E. and Tillotson, L. C. "Optical Transmission Research," Appl. Opt. 5, 1538-1549 (1966).*

Dickinson, Richard M. Wireless power transmission technology state of the art the first Bill Brown lecture, Acta Astronautica, vol. 53, Issues 4-10, The New Face of Space Selected Proceedings of the 53rd International Astronautical Federation Congress, Aug.-Nov. 2003, pp. 561-570.*

Landis, G. a., "Photovoltaic receivers for laser beamed power in space," Proc. 22nd IEEE Photov. Spec. Conf. Las Vegas, NV, pp. 1494-1502, 1991.*

* cited by examiner

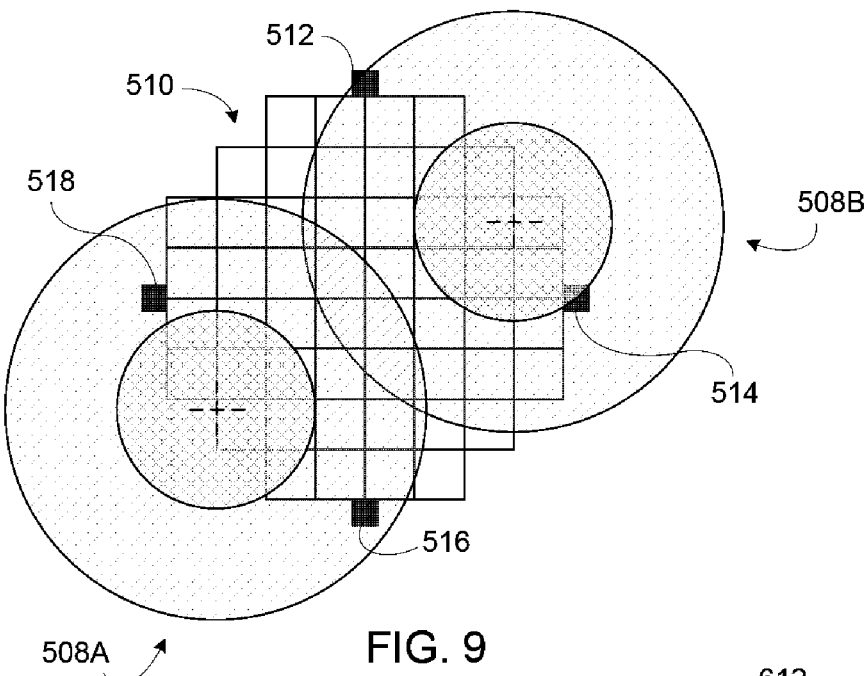
FIG. 9
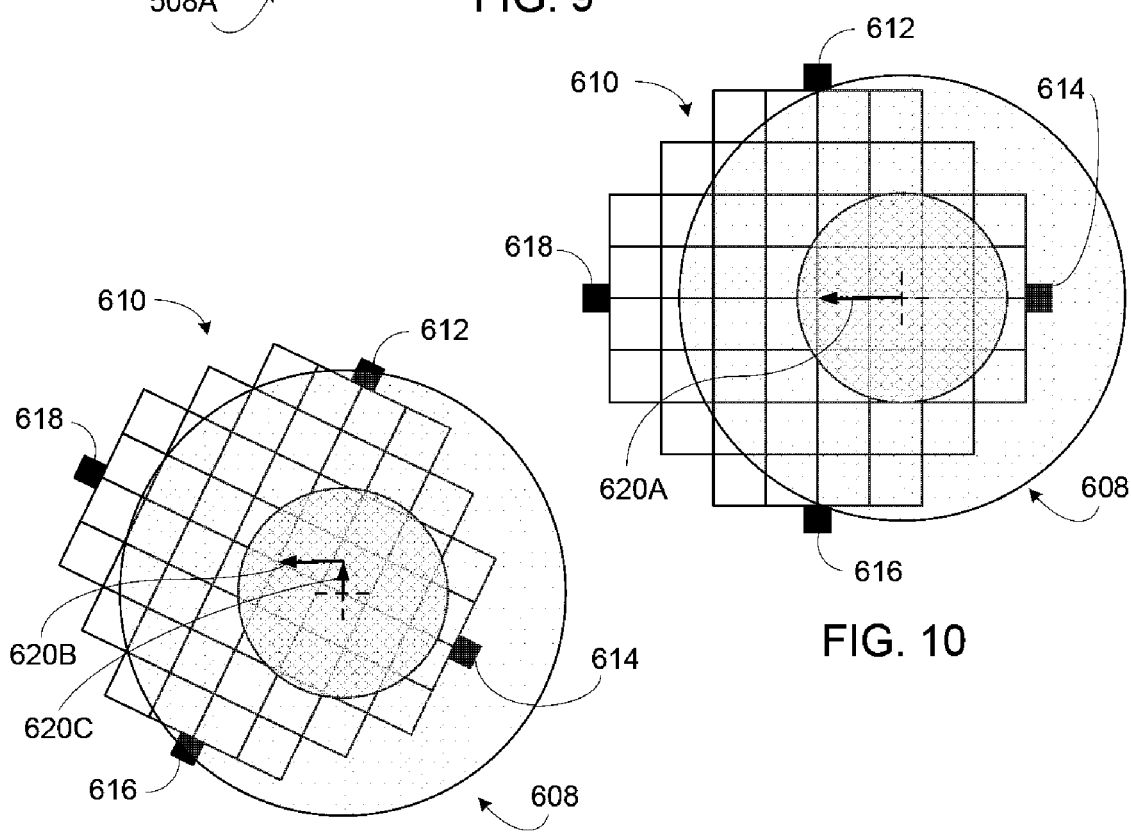
FIG. 10
FIG. 11

| Retroreflector | Polarization |
|---|---|
| 912 | ↕ |
| 914 | ↗ |
| 916 | ↔ |
| 918 | ↘ |

AIMING FEEDBACK CONTROL FOR MULTIPLE ENERGY BEAMS

RELATED APPLICATIONS

This application is related to co-pending, commonly owned U.S. Pat. application Ser. No. 11/420,086, filed May 24, 2006, entitled "Network and System for Controlling a Network for Power Beam Transmission," naming Brian J. Tillotson as the sole inventor.

FIELD OF THE INVENTION

The field of the present disclosure relates to energy beaming systems, and more specifically, to feedback control systems and methods for aiming multiple energy beams onto a moving target.

BACKGROUND OF THE INVENTION

It is possible to provide energy to a moving target or vehicle by way of an electromagnetic energy beam, such as a microwave or laser beam. Typically, the source of the energy beam is located separate and apart from the object being powered. For example, an energy beam source can be stationary relative to a vehicle or other apparatus that is being powered (to some extent) by the energy beam. In the case of a laser beam, photovoltaic cells can be used to convert the incident laser energy directly to usable electrical power at the receiving object. In the case of microwave energy, antenna grids, focusing dishes and/or other suitable means can be used to derive electrical power at the receiver. In any case, it is possible to construct a system wherein a receiving apparatus or vehicle need not carry voluminous and/or massive sources of energy (e.g., batteries, jet fuel, etc.) in order to be partially or fully provisioned with operating power.

When a system requires a relatively small amount of energy, a single-beam arrangement is usually adequate. Under such a system, sensing devices and controls maintain suitable aiming of the energy beam on the appropriate receiving area (i.e., antenna, photovoltaic array, etc.) of the object being powered. In other cases, there are vehicles or other apparatus that require considerably more energy than a single source (laser or microwave emitter, etc.) can economically and/or technologically provide. For example, a flying vehicle may require 100 kW of power in order to operate. Economically, it is desirable to use ten 10 kW lasers, rather than a single 100 kW laser, to provide the needed power in this example. Furthermore, it is often easier to package ten 10 kW lasers and their supporting hardware into a mobile platform (if desired) than to package a single 100 kW laser and it supporting hardware into the same sort of platform. Thus, economies of scale are an important—and sometime technologically imperative—matter of consideration in designing and operating systems powered by multiple energy beams.

However, a problem arises when attempting to use several energy sources in concert to power an apparatus. Specifically, it is necessary to independently control each energy beam source so as to keep all of the respective energy beams accurately aimed at the receiving area of the powered apparatus. Furthermore, it is economically desirable to provide an energy beam receiving area (or array) on the apparatus or vehicle that is not much larger than the meaningful width of an energy beam.

Use of various means and methods for aiming a single energy beam are known in the prior art. However, these prior art systems may be unsuitable when multiple energy beams must be accurately maintained on a single receiving apparatus. Therefore, novel systems and methods that resolve the foregoing problems and concerns would have great utility.

SUMMARY

Feedback control systems and methods in accordance with the teachings of the present disclosure can be used to maintain accurate aiming of several energy beams onto a single receiving target or area. Economies of scale are advantageously realized through the use of multiple sources relative to a single, relatively large energy beam source. Other advantages may stem from the use of energy beam source redundancy.

In one embodiment, a system includes a receiving assembly including a target area configured to receive an incident electromagnetic energy and to convert the incident electromagnetic energy into an electrical or thermal output. The incident electromagnetic energy includes a contribution from a plurality of energy sources. The system also includes a control assembly including a plurality of sensors disposed about the target area. Each sensor is configured to receive a portion of electromagnetic energy not incident on the target area and to provide a corresponding output signal. The control assembly further includes a processing device operatively coupled to the plurality of sensors and configured to analyze the output signals from the plurality of sensors. The control assembly is also configured to detect a misalignment of the contribution from at least one of the plurality of energy sources, and to provide at least one control signal to the at least one of the plurality of energy sources tending to correct the misalignment.

In another embodiment, a system includes an energy receiving device configured to convert incident electromagnetic energy into electrical or thermal energy. The system also includes a plurality of sources configured to emit respective energy beams, and a plurality of sensors configured to provide respective detection signals corresponding to one or more of the energy beams incident to the energy receiving device. The system further includes a controller configured to receive the detection signals and provide one or more control signals. The plurality of sources are further configured to controllably aim the respective energy beams at the energy receiving device in accordance with the one or more control signals.

In yet another embodiment, a method includes controllably aiming a plurality of modulated energy beams at an energy receiving device. The method also includes sensing a misalignment portion of at least one of the plurality of modulated energy beams proximate the energy receiving device. The method further includes providing at least one control signal to adjust an aiming of the at least one of the plurality of modulated energy beams corresponding to the misalignment. The method includes converting at least a portion of the plurality of modulated energy beams incident to the energy receiving device into electrical or thermal energy.

The features, functions, and advantages that are discussed herein can be achieved independently in various embodiments of the present invention or may be combined various other embodiments, the further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

FIG. 9 is a schematic plan view of an energy receiving device under exemplary operating conditions;

FIG. 10 is a schematic plan view of an energy receiving device under exemplary operating conditions;

FIG. 11 is a schematic plan view of the energy receiving system of FIG. 10 under exemplary operating conditions;

DETAILED DESCRIPTION

The present disclosure introduces energy beaming systems and feedback control of such systems. Many specific details of certain embodiments of the invention are set forth in the following description and in FIGS. 1-21 to provide a thorough understanding of such embodiments. One skilled in the art, however, will understand that the invention may have additional embodiments, or that the invention may be practiced without several of the details described in the following description.

Figure 1:
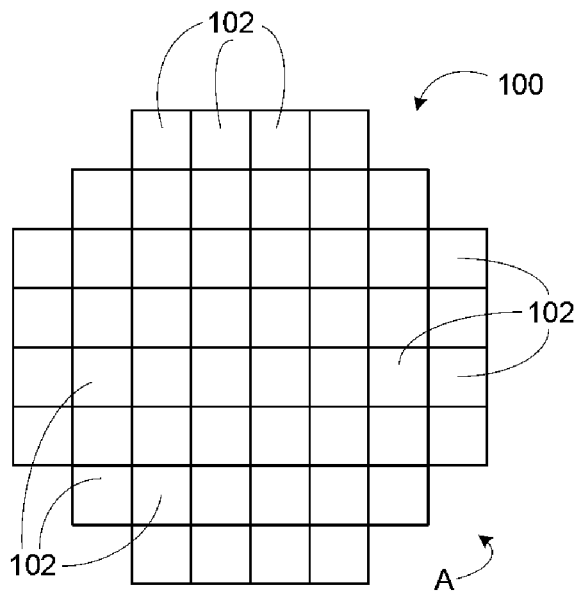
FIG. 1 is a schematic plan view depicting an energy receiving device in accordance with an embodiment of the invention.

Principles of the Invention: FIG. 1 is a schematic plan view of an energy receiving device 100 in accordance with an embodiment of the invention. The energy receiving device 100 is comprised of a plurality of photovoltaic (PV) panels 102. Each of the PV panels 102 can be defined by a single PV cell, or a plurality of PV cells (not discretely shown) electrically coupled to function as an entity. In any case, the PV panels 102 are configured to directly convert incident photonic (i.e., light) energy into electrical power. In turn, the PV panels 102 of the energy receiving device 100 are electrically interconnected so as to provide an aggregate quantity of electrical power in response to being illuminated by a corresponding energy beam (e.g., a laser beam). Thus, the energy receiving device 100 is an array of plural PV panels 102 arranged so as to define an overall energy-converting surface area "A".

Figure 2:
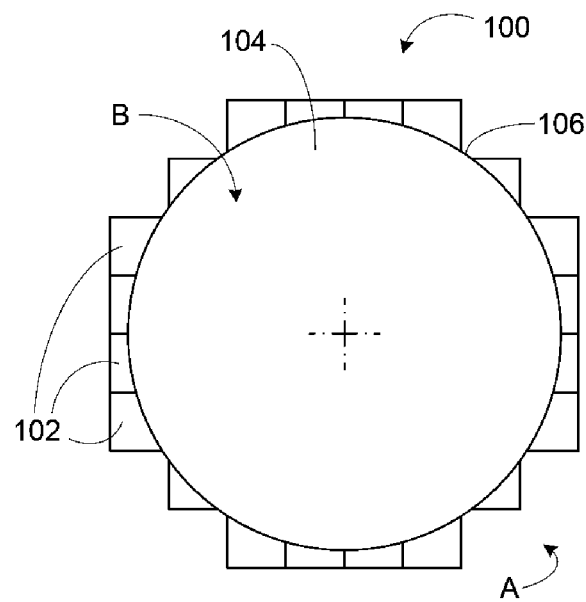
FIG. 2 is a schematic plan view depicting an energy beam incident to the energy receiving device of FIG. 1.

FIG. 2 is a schematic plan view of the energy receiving device 100 of FIG. 1 with an energy beam 104 incident thereon. For purposes of example, it is assumed that the energy beam 104 is defined by a laser beam of appropriate center frequency for use with the energy receiving device 100. That is, the energy beam 104 is of appropriate photonic energy for optimal conversion to electrical power by the PV panels 102 of the receiving device 104. In the interest of clarity, the energy beam 104 of FIG. 2 is depicted as a generally circular or disk-shaped illumination area "B" having a sharply defined boundary or perimeter 106. However, it is to be understood that a typical energy beam 104 is in fact defined by an energy gradient with highest intensity at the center of the beam and decreasing energy intensity moving radially outward from the beam center. The cross-sectional intensity of energy beams is discussed in further detail below in accordance with FIG. 4.

For purposes of FIG. 2, the illumination area "B" represents the meaningful or useful cross-sectional area of the energy beam 104. It is noted that the area "A" of the energy receiving device 100 is slightly larger, but of different shape, than the illumination area "B" of the energy beam 104. In this way, the energy receiving device 100 has sufficient area to capture and convert essentially all of the meaningful energy content of energy beam 104, provided that the energy beam 104 remains centered on the energy receiving device 100. In another embodiment (not shown), the PV panels (e.g., 102) may be differently arranged and/or of different number so as to define an energy receiving device (e.g., 100) of different shape and/or area than that of the energy receiving device 100.

Figure 3:
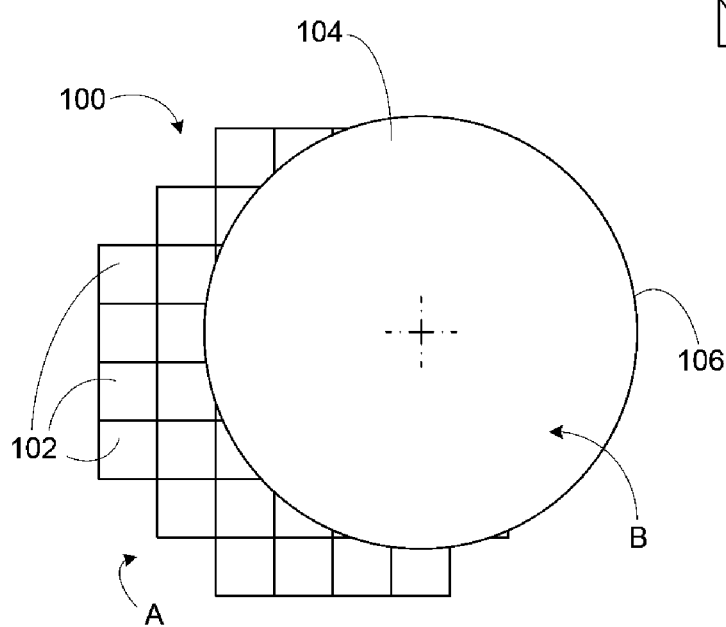
FIG. 3 is a schematic plan view depicting another state of the energy beam and energy receiving device of FIG. 2.

FIG. 3 is a schematic plan view of the energy receiving device 100 and energy beam 104 as introduced above. However, the energy beam 104 is no longer centered on the energy receiving device 100, but is shifted to the upper right. In this case, an appreciable portion of the illumination area "B" of the energy beam 104 is no longer incident to the energy-converting surface area "A" of the energy receiving device 100. As a result, there is lost beam energy that is not being converted to electrical power.

Figure 4:
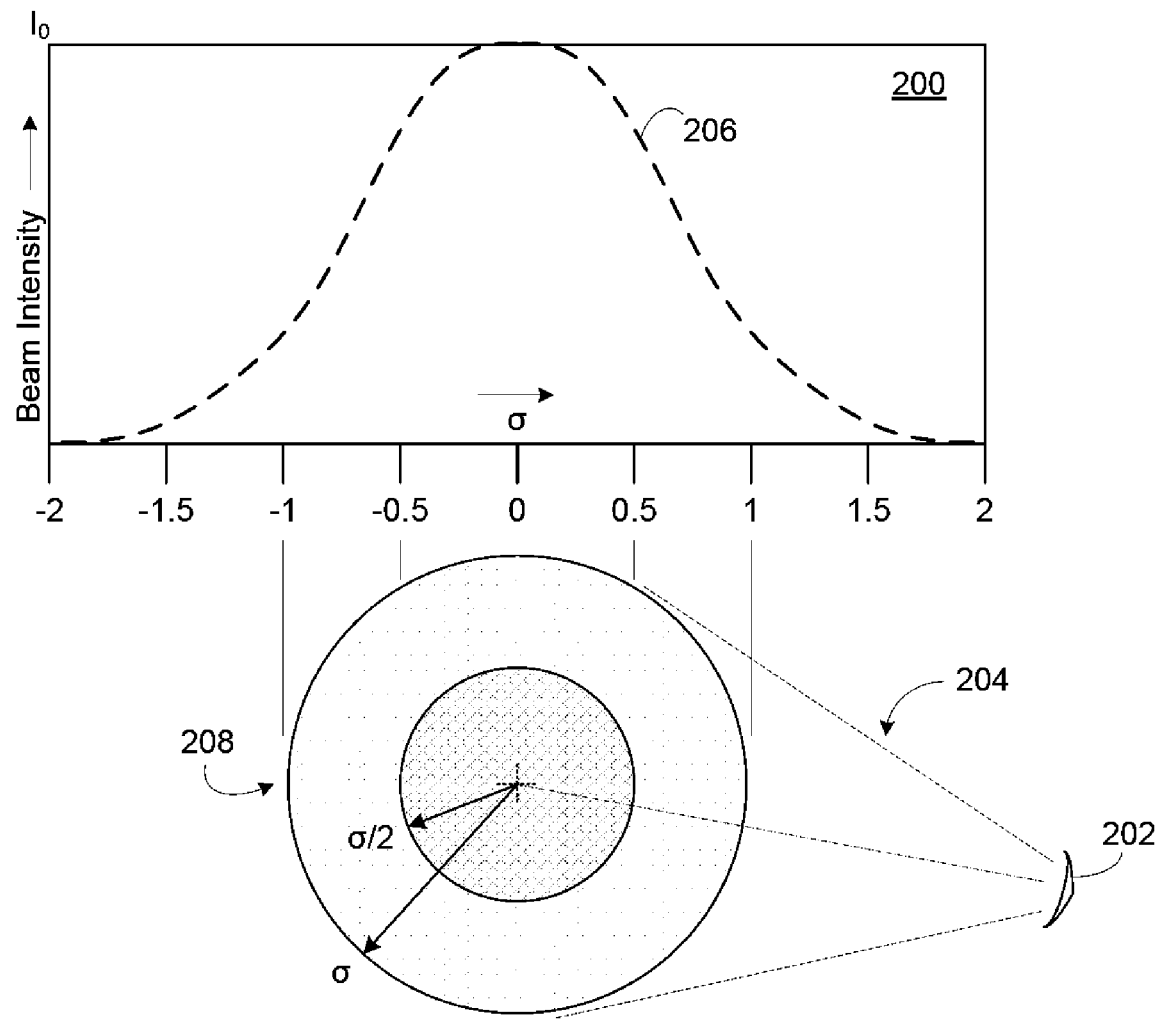
FIG. 4 is a graph showing an energy beam pattern in accordance with an embodiment.

FIG. 4 is a graph 200 showing an energy beam pattern in accordance with an embodiment of the invention. FIG. 4 includes a source 202 that emits an energy beam 204. In one embodiment, the energy beam 204 is a laser beam. In another embodiment, the energy beam 204 is a highly collimated microwave emission. Electromagnetic energy beams at other suitable center frequencies can also be used. The graph 200 is defined by a Gaussian curve 206 representing the radial intensity of the energy beam 204. Intensity is considered in terms of energy per unit of cross-sectional area incident to a surface normal to the energy beam 204 (e.g., Watts per square centimeter, etc.). As depicted, the intensity of the beam 204 is greatest at the beam center, and decreases radially away from the beam center in accordance with the Gaussian curve 206.

FIG. 4 also includes a cross-sectional view of the beam pattern 208 of the energy beam 204. As shown, the radius of the beam pattern 208 is considered in terms of a non-dimensional distance σ (sigma). The beam pattern 208 is depicted as having a central area 0.5σ in radius, and an outer area that is 1σ in radius. The energy intensity at 1σ (one sigma) is about 0.368 times the intensity at the center of the energy beam 204—that is, about $0.368 I_0$, wherein $I_0$ is the peak intensity of the energy beam 204. While a real energy beam typically has usable energy content out beyond 1σ in radius (2σ in diameter), energy beams (e.g., 104) are depicted herein as limited to 1σ in radius for purposes of clarity and simplicity. While the energy beam 204 is described in terms of a Gaussian distribution of energy intensity, it is to be understood the that present teachings contemplate use of other energy beams with correspondingly varying energy intensity patterns.

FIGS. 1 through 3 exemplify the sort of control concerns that the present teachings are directed to solving. Specifically, if the beam 104 is pointed at the center of the receiving device 100, optimum energy conversion occurs. However, in a case where the energy receiving device 104 is used on a flight vehicle that moves, or when atmospheric turbulence distorts the path of the beam, the energy beam 104 may not be pointed at the center of the energy receiving element or device 100. If the receiving device 100 is not much larger than the beam width, which is typically the case in the interest of economics, then part of the beam 104 will miss the receiving element. To minimize the loss of efficiency, the beam-receiving vehicle or apparatus typically includes means to provide feedback to the beam source. This feedback tells the beam source, through appropriate instrumentation and control, whether the beam is aimed too high or too low; too far right or too far left. Using this feedback, the beam source corrects the aiming of the beam, thereby keeping the energy beam 104 centered on the energy receiving device 100.

Several suitable feedback methods have been described in the prior art. However, these prior art methods may be unsuitable when multiple beams are used. Therefore, the prior art systems may lack the means to consistently exploit the economic and technical benefits of using multiple smaller beam sources rather than a large single beam source.

Figure 5:
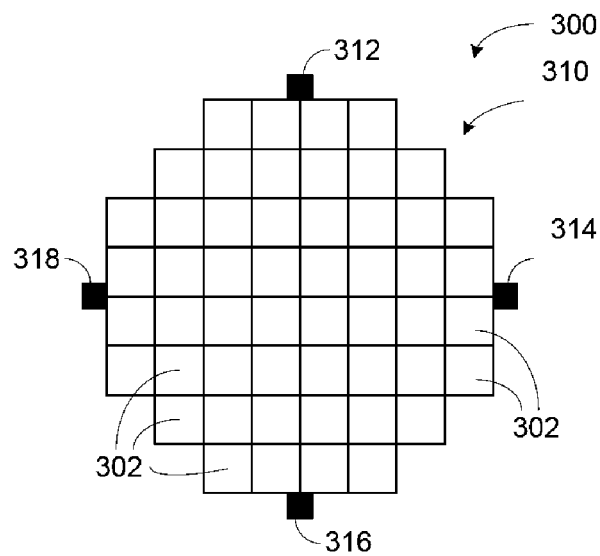
FIG. 5 is a schematic plan view of an energy receiving system in accordance with another embodiment.

FIG. 5 is a schematic plan view of an energy receiving system 300 in accordance with another embodiment of the invention. The system 300 includes a plurality of PV panels (or cells) 302 that collectively define an energy receiving device 310. Each of the PV panels 302 is configured to convert incident photonic energy into electrical power. In turn, an aggregate quantity of electrical power is produced by the energy receiving device 310. The energy receiving system 300 of FIG. 5 also includes four sensors respectively labeled 312, 314, 316 and 318. Each of the sensors 312-318 is configured to provide a detection signal corresponding to beam energy incident thereto.

Figure 6:
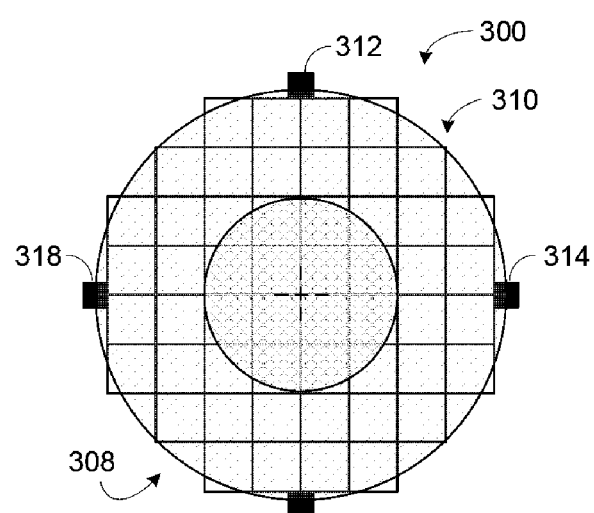
FIG. 6 is a schematic plan view of the energy receiving system of FIG. 5 under exemplary operating conditions.

FIG. 6 is a schematic plan view of the energy receiving system 300 as introduced above under typical exemplary operation. As depicted, an energy beam 308 is incident to and centered on the energy receiving device 310. Each of the four sensors 312-318 is located at a distance of about 1σ away from the center of the energy receiving device 310. Thus, the sensors 312-318 are exposed to equal quantities of illumination from the energy beam 308 of about $0.368I_0$. In turn, the four sensors 312-318 are understood to provide generally equal detection signals corresponding to the incident illumination.

Figure 7:
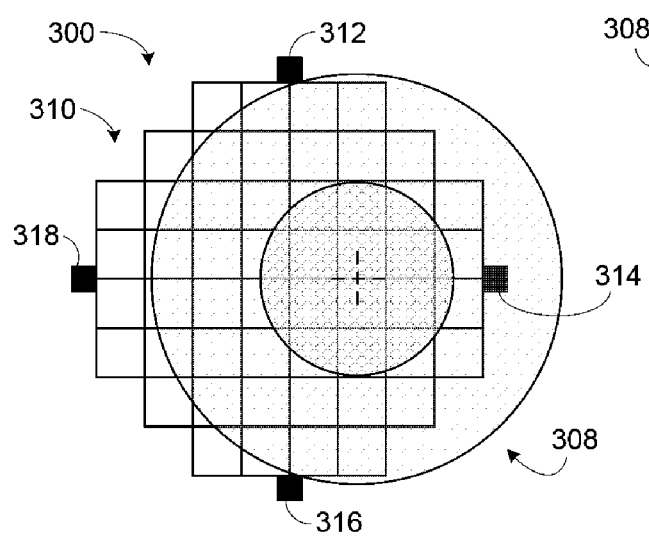
FIG. 7 is a schematic plan view of the energy receiving system of FIG. 6 under other exemplary operating conditions.

FIG. 7 is a schematic plan view of the energy receiving system 300 under different exemplary operating conditions as compared to FIG. 6. As depicted, the energy beam 308 is no longer centered on the energy receiving device 310, but is shifted about σ/3 to the right. Sensor 314 is about 2σ/3 from beam center and measures an intensity of about $0.64I_0$. Sensor 318 is located about 4σ/3 from beam center and measures an intensity of about $0.17I_0$. Each of sensors 312 and 316 are exposed to slightly less than $0.368I_0$ of energy beam 308. In any case, each of the sensors 312-318 provides a respective detection signal corresponding to the energy beam intensity incident thereon. Thus, sensor 314 provides a signal indicating the greatest intensity, sensor 318 provides a signal indicating the least intensity, and sensors 312 and 316 provide respective signals indicating intensity between the greatest and least intensity values. Typical use of the respective detection signals provided by the sensors 312-318 is described in greater detail hereinafter.

Figure 8:
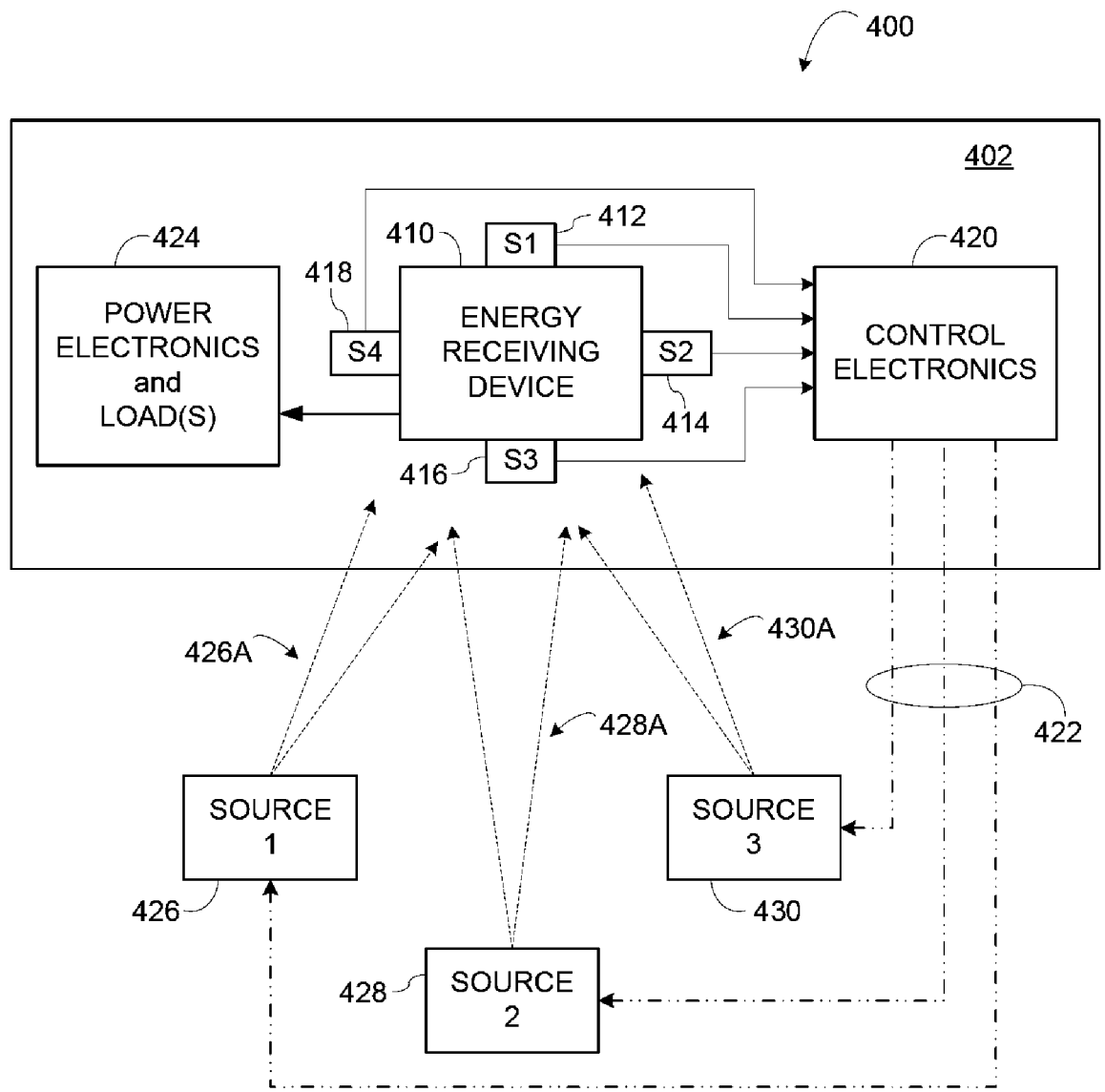
FIG. 8 is a schematic block diagram of an energy beaming and receiving system in accordance with an embodiment.

Reference is now made to FIG. 8, which is a schematic block diagram of an energy beaming and receiving system 400 in accordance with an embodiment of the invention. The system 400 includes a vehicle 402. The vehicle 402 can be, for example, an aircraft, a marine vessel, a track-mounted locomotive, etc. The vehicle 402 can also be defined by other apparatus and/or systems. The vehicle 402 includes an energy receiving device 410. The energy receiving device 410 can be defined by a number of photovoltaic panels, an antenna or dish, or any other suitable device for receiving energy from an energy beam. For purposes of example, it is assumed that the energy receiving device 410 includes an array of PV panels configured to convert incident laser energy directly to electrical power.

The vehicle 402 of the system 400 of FIG. 8 also includes four sensors 412, 414, 416 and 418 located proximate to the energy receiving device 410. Each of the sensors 412-418 is configured to provide a detection signal corresponding to an energy beam or beams incident to the energy receiving device 410. Thus, each of the sensors 412-418 operates substantially as described above in regard to the sensors 312-318 of FIGS. 5-7.

The vehicle 402 also includes control electronics 420. Control electronics (also referred to as a controller) 420 can include, for example, one or more processors, software- and/or firmware-based executable program code, a state machine, digital and/or fuzzy logic, a neural network, tuned analog filters, signal amplification stages, etc. In any case, the control electronics 420 is configured to receive the respective detection signals from the sensors 412-418 and to derive a plurality of control signals 422. The vehicle 402 further includes power electronics and load (PEL) 424. The PEL 424 is defined by one or more subsystems considered in the aggregate. The PEL 424 includes electronic and electrical circuitry configured to receive electrical power from the energy receiving device 410, and provide conditioned and/or regulated electrical power to one or more loads of the vehicle 402. Power conditioning and regulation are well known in the electrical arts and further elaboration is not required for purposes of the present teachings.

The system 400 of FIG. 8 includes three energy beam sources 426, 428 and 430. Each of the energy beam sources (hereinafter, sources) 426-430 is configured to emit a respective energy beam 426A, 428A and 430A toward the energy receiving device 410 of the vehicle 402. For purposes of example, it is assumed that each of the energy beams 426A-430A is defined by a laser beam suitably tuned for optimal energy conversion by the energy receiving device 410. Each of the sources 426-430 is further configured to controllably aim the corresponding energy beam 426A-430A at the energy receiving device 410 in accordance with the control signals 422. The control signals 422 can be provided to the sources 426-430 by wireless means, or by optical and/or wired connection. Each of the sources 426-430 can include, for example, gimbaled support hardware, a positionable mirror or mirrors, servo-motors and related drive electronics, etc. Other suitable known means can also be used to controllably aim the respective energy beams 426A-430A by way of the control signals 422.

As depicted, the system 400 of FIG. 8 comprises a closed-loop, feedback control system for beaming energy to a receiving vehicle 402. At the vehicle 402, beam energy 426A-430A incident to an energy receiving device (or array) 410 is converted to useful quantities of electrical power for energizing one or more loads 424 of the vehicle 402 itself. The controller 420 of FIG. 8 is located aboard the vehicle 402. In another embodiment, similar or other suitable control electronics can be located apart from the vehicle, such as at one or more of the sources 426-430. All of the sources 426-430 can be ground-based (i.e., stationary with respect to the vehicle 402). In the alternative, one or more of the sources 426-430 can be located aboard another vehicle or moving platform (e.g. keeping pace with the vehicle 402). Other arrangements of the components of the system 400 can also be defined and used. While the system 400 includes a total of three energy beam sources 426-430, it is to be understood that any number of sources can be used in accordance with the present teachings.

The foregoing descriptions are directed to embodiments wherein plural energy beams are converted to electrical power by an energy receiving device. However, the present teachings also contemplate other embodiments in which the energy beams are converted to thermal energy (i.e., heat). For example, plural laser beams can be directed onto a heat exchanger device carried by a vehicle. In turn, liquid propellant flows into the heat exchanger and exits as hot gas. The hot gas is then expelled through one or more nozzles to provide propulsion and/or control thrust for the vehicle. In the immediately foregoing example, a plurality of sensors and other controls, substantially as described above, maintain accurate aiming of the plural laser beams on the heat exchanger. Other embodiments that convert incident electromagnetic energy beams into thermal energy can also be used.

Known control techniques work adequately for controlling a single beam system. But, such known techniques may fail if more than one energy beam is targeted to the same receiving device (and corresponding sensors). Thus, known techniques may not be suitable for use with the system 400 of FIG. 8. Reference is now made to FIG. 9, which depicts an energy receiving device 510 with two energy beams 508A and 508B incident thereto. As shown, the energy beams 508A and 508B are centered on respectively different locations of the energy receiving device 510. However, neither energy beam 508A nor 508B is centered on the center of the energy receiving device 510. Furthermore, the four sensors 512-518 detect respectively different intensities of both energy beams 508A and 508B. This presents a problem, in that known techniques typically do not provide for distinguishing one energy beam from another at the sensors 512-518. In turn, such known techniques typically do not provide for appropriate control signals so as to correct the aiming of the energy beams 508A and 508B.

In order to resolve the location of each energy beam incident to a receiving device, there must be some way to make each beam distinct from all other incident energy beams. One approach is to use a different wavelength (i.e., center frequency) for each energy beam, and use multiple sets of sensors with each set tuned to a specific wavelength. Each sensor set detects the location of only one energy beam, so the sensor element can clearly distinguish each beam's incident location and a feedback control signal can be provided to the appropriate source for each energy beam.

However, the foregoing approach is generally effective only for microwave energy sources, and is not generally effective for laser sources, for at least two reasons. First, the wavelength of a laser is determined by its lasing medium. For example, a $CO_2$ laser emits only a small bandwidth of wavelengths. It is not possible to arbitrarily choose more convenient wavelengths in order to easily distinguish between plural laser beams. This is especially so in the realm of high-power, continuous-operation lasers, where the choices of lasing medium are quite limited, and therefore the choice of wavelengths is limited as well. Second, the wavelength of the laser must be carefully matched to the band gap of the PV panel or cell receiving the light. When a PV cell receives a photon of light at the appropriate wavelength, it produces only enough energy to create one electron-hole pair in that cell's semiconductor junction. If the wavelength of the incident laser light is too long, there is insufficient photon energy to create the electron-hole pair. If the wavelength is too short, only a portion of the photonic energy is used to create the electron hole pair, with a relatively large residual energy portion wasted as heat. The result of the two constraints above is that distinguishing laser power beams by wavelength is unlikely to be technically or economically effective. Other techniques must be used.

The present teachings solves the problem with respect to laser beams (and is applicable to microwaves as well) by modulating each energy beam so that each is mathematically orthogonal to all other beams incident on an energy receiving device. Three types of orthogonal modulation are contemplated herein: amplitude, polarization, and angular "coning". Each is described in turn below.

Amplitude Modulation: Consider two energy beams that, for purposes of the following discussion, are respectively referred to as beam $\alpha$ (alpha) and beam $\beta$ (beta). Further assume that beam $\alpha$ is modulated at its source so that it amplitude $A(t)$ varies with time as:

$$A(t) = A_0 + a_{mod} \sin(\omega_\alpha t) \quad \text{(Eqn. 1a)}$$
$$= A_0 + a_{mod} \sin(2\pi f_\alpha t) \quad \text{(Eqn. 1b)}$$

And let energy beam $\beta$ be modulated so its amplitude varies as:

$$B(t) = B_0 + b_{mod} \sin(\omega_\beta t) \quad \text{(Eqn. 2a)}$$
$$= B_0 + b_{mod} \sin(2\pi f_\beta t) \quad \text{(Eqn. 2b)}$$

where: $A_0$ and $B_0$ are the mean amplitudes of the two energy beams $\alpha$ and $\beta$ at the center of each beam (corresponding to $I_o$ in FIG. 4), $a_{mod}$ and $b_{mod}$ are the magnitude by which the amplitudes vary, and $f_\alpha$ and $f_\beta$ are the frequencies by which the energy beams vary.

Given these amplitudes at the energy beam sources, each energy beam's amplitude $A(t,r)$ at a particular location r is a scalar multiple of the beam's center amplitude at the source. Boldface indicates that r is a vector. Thus:

$$A(t, r) = c(\alpha, r)[A_0 + a_{mod}\sin(2\pi f_\alpha t)] \quad \text{(Eqn. 3a)}$$
$$= c(\alpha, r)A_0 + c(\alpha, r)a_{mod}\sin(2\pi f_\alpha t)] \quad \text{(Eqn. 3b)}$$

Where: $c(\alpha,r)$ is a coefficient determined by range from the energy beam source $\alpha$ and the distance x radially from the energy beam center. Specifically:

$$c(\alpha,r)=c(\text{range})c(x/\sigma_\alpha) \quad \text{(Eq. 4)}$$

Where: $x/\sigma_\alpha$ indicates that distance from the center of energy beam $\alpha$ is measured as a fraction of that energy beam's width at a given distance from the source. Equations substantially identical to Eqs. 3a-b and 4 above, and Eqs. 5a-5c, 6 and 7a-b below, can be derived for beam $\beta$.

Amplitude sensors (e.g., sensors 312-318 of FIG. 7) distributed about the energy receiving device measure each energy beam's amplitude at the various sensor locations. For example, combining equations 3 and 4 above, it is seen that sensor 312 measure amplitude $A_1$ as given by:

$$A_1(t, r_1) = c(\alpha, r_1)[A_0 + a_{mod}\sin(2\pi f_\alpha t)] \quad \text{(Eqn. 5a)}$$
$$= c(\alpha, r_1)A_0 + c(\alpha, r_1)a_{mod}\sin(2\pi f_\alpha t)] \quad \text{(Eqn. 5b)}$$
$$= c(\text{range}_\alpha)c(x_1/\sigma_\alpha)A_0 + c(\text{range}_\alpha)c(x_1/\sigma_\alpha)a_{mod}\sin(2\pi f_\alpha t)] \quad \text{(Eqn. 5c)}$$

While sensor 514 measures amplitude $A_2$ given by:

$$A_2(t,r_2) = c(\text{range}_\alpha)c(x_2/\sigma_\alpha)A_0 + c(\text{range}_\alpha)c(x_2/\sigma_\alpha)a_{mod}\sin(2\pi f_\alpha t)] \quad \text{(Eq. 6)}$$

It is assumed that the variation in c(range) between the two sensors 312, 314 is insignificant, given that the range from an energy beam source to a receiving vehicle (e.g., 402 of FIG. 8) can be, typically, on the order of at least a few kilometers. Furthermore, the size of the receiving device (e.g., 510 of FIG. 7) is typically no more than a few meters in span.

Given the assumption of the paragraph immediately above, and equations 5 and 6, it can been shown that the ratio of the amplitude modulation at the two sensors (e.g., 312, 314 of FIG. 7) is the same as the ratio of the average amplitudes at the two sensors. Namely:

$$A_1(t, r_1)/A_2(t, r_2) = \{c(x_1/\sigma_\alpha)a_{mod}\sin(2\pi f_\alpha t)]\}/\{c(x_2/\sigma_\alpha)a_{mod}\sin(2\pi f_\alpha t)]\} \quad \text{(Eqn. 7a)}$$
$$= \{c(x_1/\sigma_\alpha)A_0\}/\{c(x_2/\sigma_\alpha)A_0\} \quad \text{(Eqn. 7b)}$$

Equation 7a shows the ratio of the amplitude modulation measurements at the two sensors. Equation 7b shows the ratio of the average amplitude at the two sensors, and that this ratio is equal to the ratio of amplitude modulation. Therefore, if it is possible to measure only the magnitude of amplitude modulation at each sensor, than it is possible to compute the ratios of those measurements and use the results as the ratios of the average amplitudes at each sensor. These ratios can be used as inputs to well-known algorithms to adjust energy beam aiming.

However, another question arises: how to distinguish the modulation amplitude of one beam (e.g., 508A) from that of another beam (e.g., 508B) illuminating the same sensors (e.g., 512-518)? The present invention solves this issue by way of orthogonal modulations. For example, let frequencies $f_\alpha$ and $f_\beta$ be integral multiples of a lower frequency, $f_0$. Given this constraint, the two energy beams exhibit orthogonal modulation over one period $P_0$ of the lower frequency, $f_0$. For example, if $f_0$ is 10 KHz, then $f_\alpha$ could be 20 kHz and $f_\beta$ could be 30 kHz. Then the period $P_0$ of $f_0$, is given by:

$$P_0 = 1/f_0 = 1/10^4 \text{ sec}^{-1} = 100 \text{ microseconds} \quad \text{(Eq. 8)}$$

Therefore, if electronics (e.g., 420 of FIG. 8) connected to the sensors associated with an energy receiving device take multiple amplitude samples over a period of 100 microseconds (or an integral multiple thereof), the samples can be processed to isolate the magnitude of variation in beam $\alpha$ from the magnitude of variation in beam $\beta$. Processing of the samples can be described as a set of transfer functions, $h_i$, where the index i covers the set of beams: in our example, i is an element of $\{\alpha, \beta\}$. Transfer functions $h_\alpha$ and $h_\beta$ transform the output of a sensor into $c(x/\sigma_\alpha)a_{mod}$ or $c(x/\sigma_\beta)b_{mod}$, i.e. the measured magnitude of variation in beam $\alpha$ or beam $\beta$ (e.g., 508A or 508B of FIG. 9). Appropriate forms of processing to implement the functions $h_i$ are known. For example, if the samples are digital, they can be processed by a Fast Fourier Transform or Discrete Fourier Transform to isolate individual frequencies. If the samples are continuous analog inputs, tuned analog filters can be used to isolate individual frequencies. Other suitable signal processing methods can also be used.

The detection signal output of each sensor (e.g., 512-518 of FIG. 9) is input to a transfer function for each beam's modulation. Thus, the ongoing two-beam, four-sensor example would include eight measurements of variation in amplitude, as shown in Table 1 below:

TABLE 1

| | | Sensor 1 | Sensor 2 | Sensor 3 | Sensor 4 |
|---|---|---|---|---|---|
| Beam | $\alpha$ | $c(x_1/\sigma_\alpha)a_{mod}$ | $c(x_2/\sigma_\alpha)a_{mod}$ | $c(x_3/\sigma_\alpha)a_{mod}$ | $c(x_4/\sigma_\alpha)a_{mod}$ |
| | $\beta$ | $c(x_1/\sigma_\beta)b_{mod}$ | $c(x_2/\sigma_\beta)b_{mod}$ | $c(x_3/\sigma_\beta)b_{mod}$ | $c(x_4/\sigma_\beta)b_{mod}$ |

Where: Each matrix cell (i, j) contains the measurement that results from applying transfer function $h_i$ (for beam i) to the output of sensor j.

The detection signals corresponding to each energy beam's modulation magnitude are sent to the beam source for that beam. For example, measurements $c(x_1/\sigma_\beta)b_{mod}$ through $c(x_4/\sigma_\beta)b_{mod}$ can be sent directly to energy beam source $\beta$. New measurements may be transmitted periodically or only when user-specified conditions occur, such as a user-specified mismatch between measurement values, which indicates that a beam is off target by more than a selected distance. If periodic transmission is used, the interval between transmissions may be user-selected to meet the needs of the application. Likewise, the means of transmission can be any appropriate method for the particular application, e.g. digital messages sent via wireless means. The values transmitted may be scaled or normalized by the control electronics, or otherwise transformed for efficiency of transmission.

In addition, some embodiments of sensors may transmit data about sensor configuration (once) and about physical orientation (whenever it changes substantially). This can help the respective beam sources (e.g., 426-430 of FIG. 8) and/or the control electronics (e.g., 420 of FIG. 8) to properly interpret and respond to the detection signals. FIGS. 10 and 11 illustrate why this is needed: a given set of sensor signals may correspond to different beam offsets if the sensors' relative positions change. FIG. 10 includes an energy receiving device 610 and four sensors 612-618. As depicted, an energy beam 608 is incident to the energy receiving device 610, and is focused off-center toward sensor 614. Of particular note is that the energy beam 608 is shifted off center along a single Cartesian axis (i.e., X-axis), as indicated by arrow 620A. In comparison, FIG. 11 shows the same energy receiving device 610 rotated approximately 30 degrees clockwise with respect to the orientation depicted in FIG. 10. However, the energy beam 608 of FIG. 11 is incident to the same relative location on the energy receiving device 610. As a result, correcting the beam 608 location back to the center of the received requires either a diagonal move, or a two-step Cartesian pathway (i.e., distinct X-axis and Y-axis correction vectors) as indicated by the arrows 620B and 620C.

At the source and/or control electronics, one of several appropriate algorithms is applied to the energy beam modulation magnitude (and orientation of the receiving element, if included) as conveyed by the detection signals. These algorithms estimate the current offset of the energy beam relative to the center of the energy receiving device. The output of the algorithm drives a steering mechanism that moves the energy beam toward the center of the energy receiving device. Alternatively, the user may choose an embodiment wherein the energy beam offset (from center) is estimated at the energy receiving device, and only the offset is transmitted to the corresponding energy beam source.

Other embodiments may use intensity measurements (i.e., detection signals) rather than amplitude measurements, since intensity can be less costly to measure and to control. However, intensity of an electromagnetic beam is proportional to the square of the wave's amplitude. Thus, intensity modulation and intensity measurements are equivalent to amplitude modulation and amplitude measurements with appropriate scaling laws applied. Scaling also applies to the energy beam width: the width at which intensity drops to 1/e (approx. 0.368) of peak value is $1/\sqrt{2}$ as large as the 1/e width for amplitude.

Polarization Modulation: With polarization modulation, the amplitude of each energy beam is constant at its source, but each energy beam is linearly polarized and its direction of polarization rotates. Consider two energy beams, $\alpha$ and $\beta$. Let beam $\alpha$ be modulated at its source so that its polarization vector A(t) varies with time as indicated below $$A(t)=\sin(2\pi f_\alpha t)+j\cos(2\pi f_\alpha t) \quad (Eq. 9)$$

And let energy beam $\beta$ be modulated so its polarization vector B(t) varies as:

$$B(t)=\sin(2\pi f_\beta t)+j\cos(2\pi f_\beta t) \quad (Eq. 10)$$

Where: boldface denotes vector quantities, $f_\alpha$ and $f_\beta$ are the frequencies at which the polarization vectors rotate, and j is the square root of negative one (i.e., imaginary operator). The rotational frequencies of the energy beams (e.g., 508A and 508B) are chosen to be orthogonal—that is, each is an integral multiple of a lower frequency, $f_0$.

In a typical embodiment, each sensor (e.g., 512-518 of FIG. 9) is most sensitive to one polarization direction. This can be accomplished by covering each sensor with a polarizing filter. As each energy beam (e.g., 508A and 508B) rotates, the intensity measured by each sensor oscillates between zero and the full local (i.e., incident) intensity of the energy beam: $c(\text{range}_\alpha) c(x_j/\sigma_\alpha) A_0$. The detected intensity is greatest when the energy beam polarization is aligned to the sensor polarization. A given energy beam is aligned with a particular sensor twice per rotation: once when the two are at a relative angle of zero and once when they are at a relative angle of 180 degrees. Therefore, the frequency of each sensor's single-beam oscillation is twice as great as a detected beam's rotational frequency, as expressed below:

$$f_{\alpha\_sensed}=2f_\alpha \quad (Eq. 11)$$

Just as for amplitude modulation, if control electronics (e.g., 420 of FIG. 8) connected to the sensors associated with an energy receiving device take multiple intensity samples over a period $P_0=1/f_0$, or an integral multiple thereof, the corresponding detection signals can be processed to isolate the magnitude of variation in beam $\alpha$ from the magnitude of variation in beam $\beta$. Processing of the detection signals can be described as a set of transfer functions, $h_i$, where the index i covers the set of beams. This produces a set of measurements, each one indicating the value of $c(\text{range}_i) c(x_j/\sigma_i) A_0$, for beam i at sensor j. Corresponding control signals (e.g., 422 of FIG. 8) are then sent to the appropriate beam source or sources (e.g., 426-430 of FIG. 8). Ultimately, the ratios of the values at each sensor are used to compute an energy beam's offset from the center of the energy receiving device. The offset is then used to determine the proper adjustment to the energy beam aiming.

Angular "Coning": Other embodiments of the present teachings use coning, wherein the aiming of each beam includes a small sinusoidal offset in azimuth and elevation. The result is that the nominal aim point of each beam cycles around the center of the receiving element. This cycling may be generally circular in pattern, or elliptical, or any other suitably shaped cycling pattern.

Figure 12:
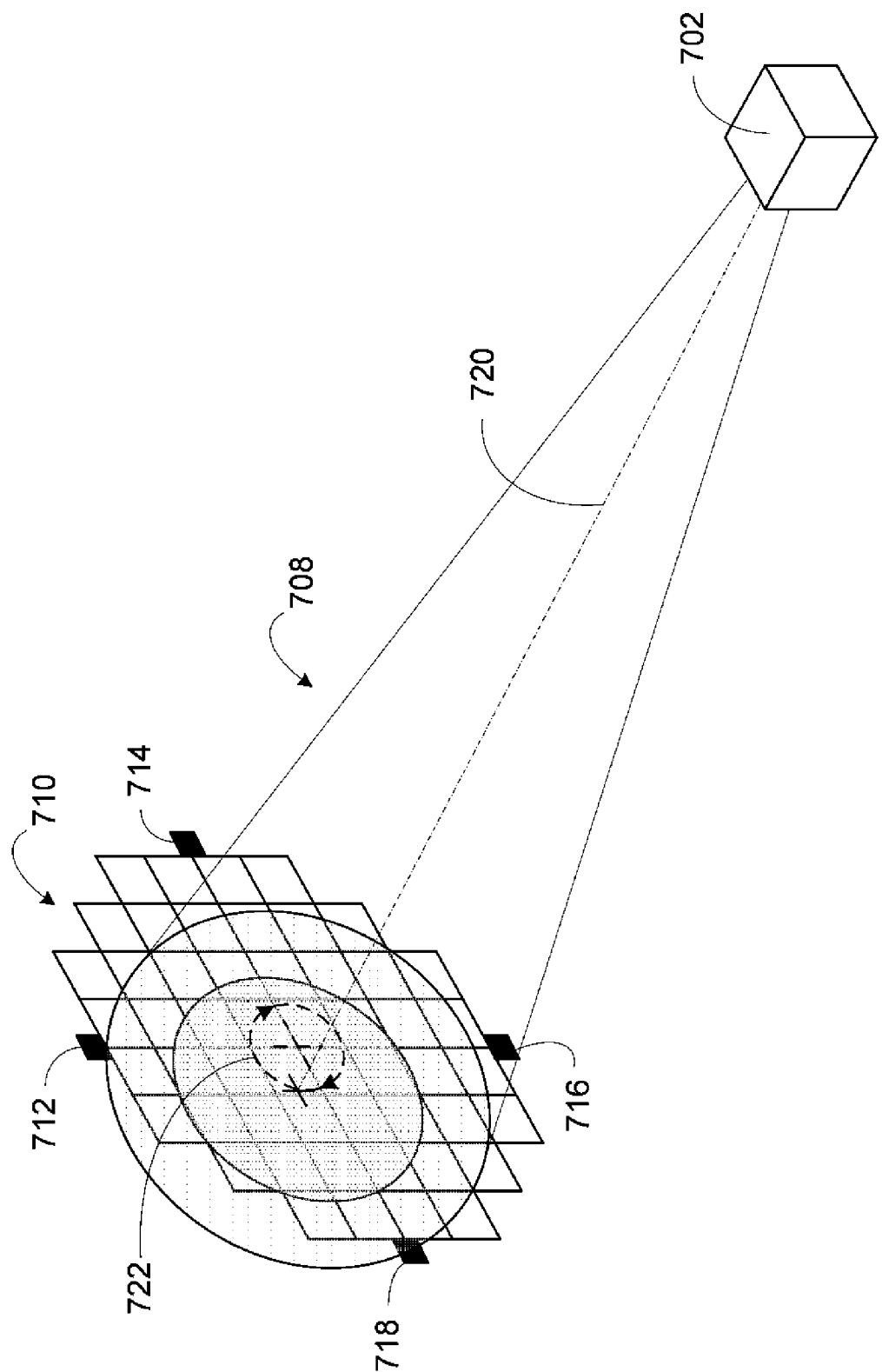
FIG. 12 is an isometric schematic view of an energy receiving device under exemplary operating conditions.

Reference is now made to FIG. 12, which includes an energy beam source (source) 702 emitting an energy beam 708 incident to an energy receiving device 710. Four sensors 712-718 are distributed about the energy receiving device 710. The energy beam 708 is defined by a centerline 720. As depicted in FIG. 12, the source 702 is configured and controlled so as to impart a circular cyclic motion or "coning" modulation to the energy beam 708. In other words, the energy beam 708 is modulated so as to whirl or revolve, as opposed to rotating about the centerline 720. As a result, the center of the energy beam 708 repeatedly traces a circular pattern 722 incident to the energy receiving device 710 by virtue of the coning modulation. The center of the circular motion is referred to as the coning center.

In a typical embodiment that uses coning modulation, the intensity of each energy beam is constant (no amplitude or similar modulation). However, as the aim point revolves (e.g., 722 of FIG. 12), the beam center 720 moves closer to and farther from each sensor 712-718, such that the intensity measured at each sensor 712-718 rises and falls. If a beam coning center matches the energy receiving device's center as in FIG. 12, the energy beam intensity measured at every sensor 712-718 rises and falls by the same amount, and at 90 degree phase intervals from the neighboring sensors.

Figure 13:
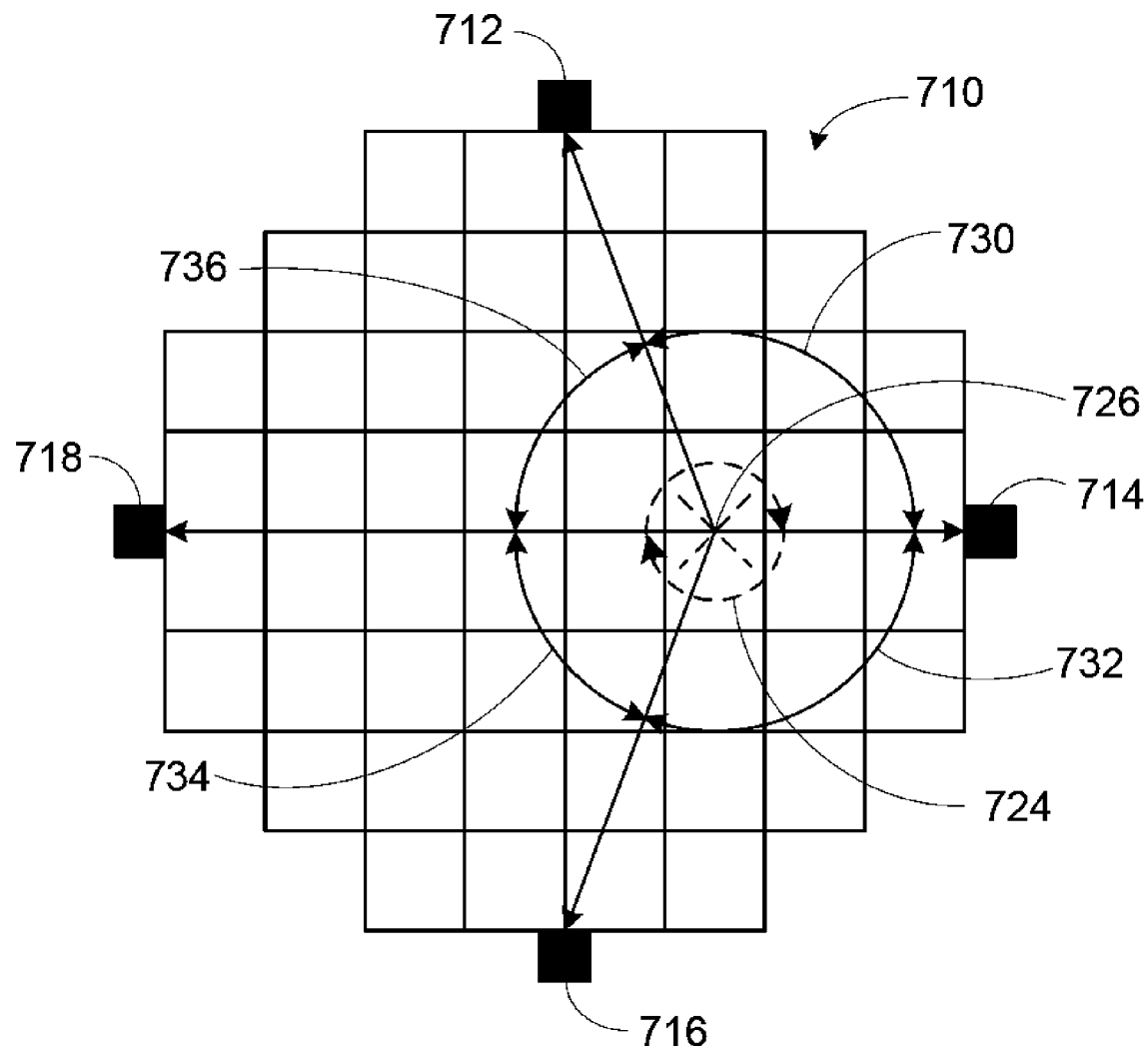
FIG. 13 is a schematic plan view of an energy receiving device under exemplary operating conditions.

Reference is now made to FIG. 13, which depicts the energy receiving device 710 and sensors 712-718 as respectively introduced above. A coning modulated energy beam (not shown in FIG. 13) is incident to the energy receiving device 710, wherein the coning center of the energy beam traces a circular pattern 724. It is noted that the coning center 726 is shifted (i.e., offset) away from the center of the energy receiving device 710 toward the sensor 714. With the coning center 726 offset from the center of the energy receiving device 710, the intensity measured at every sensor 712-718 rises and falls by different amounts. More importantly, the maximum and minimum intensity at each sensor 712-718 does not occur at ninety-degree phase intervals from the preceding and following sensors.

The phase where each sensor 712-718 measures (i.e., detects) its greatest intensity reveals the direction from that sensor 712-718 to the coning center 726. In most cases, two sensors are sufficient to locate the coning center using relative phase information alone. However, if the coning center 726 is collinear with two sensors—as it is with sensors 714 and 718 in FIG. 13—the location is ambiguous unless intensity variation is used in addition to relative phase. Phase measurements from three or more non-collinear sensors 712-718 are sufficient to give a unique location for the coning center 726. A numerical simulation of this approach is discussed hereinafter. FIG. 13 depicts the respective phase angles 730-736 defined by consecutive pairs of the sensors 712-718 and the coning center 726. It is these angles 730-736 that can be determined through appropriate signal processing of the detection signals provided by the sensors 712-718, so as to derive corresponding control signals.

As with amplitude modulation and polarization modulation, it is necessary to be able to distinguish the offset or off-center position of each energy beam from the others. With coning modulation, each energy beam is modulated to cycle at a frequency fi that is orthogonal to the other energy beams' coning frequencies. At each sensor, appropriate transfer functions isolate the oscillation caused by each energy beam and measure its phase and magnitude. These measurements, or corresponding control signals derived there from, are sent to each energy beam source (e.g., 426-430 of FIG. 8, etc.), where they are used to estimate the offsets of the respective coning centers and thereby to drive the correction of the energy beam aiming.

One benefit, among others, of coning modulation is that it requires no additional hardware. This is an advantage relative to amplitude modulation, which requires hardware to modulate the amplitude of a high-power laser—not an easy problem with some lasers. It is also advantageous relative to polarization modulation, which requires polarizing filters on the sensors (e.g., 712-718). Polarizing filters are not particularly costly, but add weight and potential failure modes. More important, polarization modulation requires hardware to modulate the polarization of a high-power laser—difficult or impossible with some lasers. By contrast, nearly any energy beam source that is capable of aiming the beam fast enough to track, for example, a moving vehicle through turbulent air has adequate hardware and dynamic characteristics to introduce a suitable coning modulation into the energy beam.

The cyclic speed and size of the coning circle (e.g., 724 of FIG. 13) may be determined by the user, based on tradeoffs of feedback communications bandwidth, vehicle or target maneuverability, range between source and energy receiving device, expected amount of turbulence, size of the receiving element, and efficiency. The speed and size of the coning circle may even be adjusted dynamically to optimize performance as each of these parameters changes.

Other Embodiments: Coning modulation can use retroreflectors at each sensor position, rather than sensors in the conventional sense. In such an embodiment, as an energy beam center gets closer to each retroreflector, that retroreflector reflects more light back toward the corresponding energy beam source. Each source observes the energy receiving device with a telescope or other suitable arrangement connected to one or more light sensors. Various optical designs allow a telescope to use the same primary optical element as the energy beam emitter, so a separate telescope is not required. Each light sensor's detection signal is input to a transfer function that selectively passes the coning frequency of the energy beam source. This selection of the coning frequency is needed when several beam sources are close together: due to diffraction, reflection from a small retroreflector will have a much wider beam pattern than an energy beam from a large aperture, so each energy beam's reflection may spread out enough to cover several energy beam sources.

Figure 14:
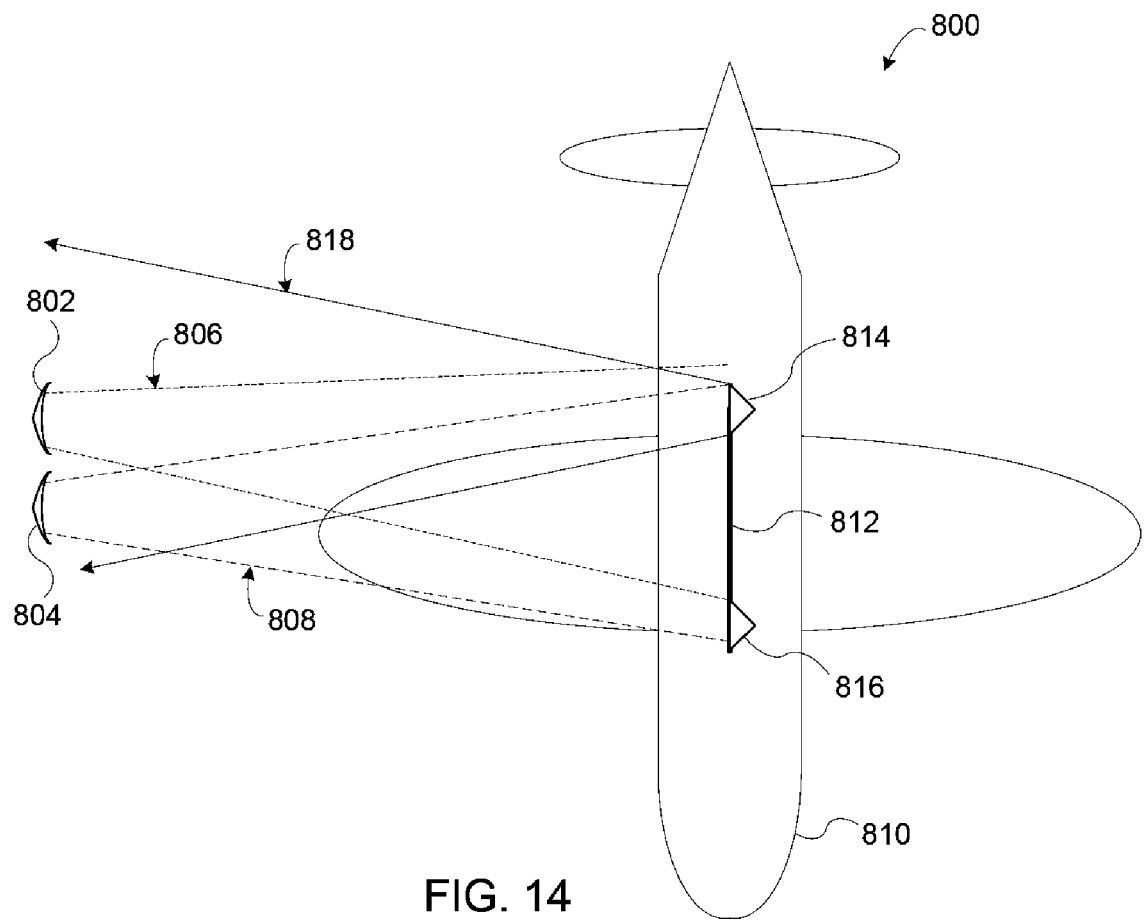
FIG. 14 is a schematic plan view of an energy beaming system in accordance with another embodiment.

FIG. 14 depicts an exemplary system 800 in which retroreflectors are used. The system 800 includes two energy beam sources 802 and 804, which are emitting respective energy beams 806 and 808 toward an aircraft 810. The aircraft 810 includes and supports an energy receiving device 812 that is suitably configured to receive and convert the incident energy beams 806-808 into electrical power. As depicted in FIG. 14, it is assumed that energy beams 806-808 are laser beams. The aircraft 810 also supports a plurality of retroreflectors 814 and 816. While two retroreflectors are shown in FIG. 14 for simplicity, it is to be understood that any suitable number (e.g., three, four, etc.) could be used. In any case, the retroreflectors 814-816 are configured to reflect a portion of the energy beam incident thereon back toward the corresponding sources 802 and 804.

FIG. 14 also includes a reflected energy beam 818. The reflected energy beam 818 results from respective portions of energy beams 802 and 804 incident to retroreflector 814. Only a single reflected energy beam 818 is shown in FIG. 14 for simplicity. The reflected energy beam 818 fans out as it moves away from the retroreflector 814 such that both sources 802 and 804 receive respective portions of the reflected energy beam 818. Therefore, each beam source 802 and 804 must be able distinguish its own energy beam reflection. Such differentiation of signals is typically accomplished by way of control electronics (e.g., 420 of FIG. 8, etc.) located at the sources 802-804 themselves, either individually or as a single control apparatus (not shown in FIG. 14) serving both sources 802-804.

Control electronics can utilize a suitable transfer function in order to distinguish the amplitude and phase of variation in reflected light from a selected energy beam. When the coning center is in the middle of (i.e., centered on) an energy receiving device, the reflected light's amplitude varies little. When the coning center is not centered on the receiving device, the reflected light is brightest when the beam is closest to a sensor—for example, sensor 714 of FIG. 13. The phase of the peak in reflected light tells the beam source the angle from the receiving element's center to the coning center. The magnitude of the variation tells it the distance from the energy receiving device's center to the coning center (e.g., 726 of FIG. 13). The corresponding energy beam source (or associated control electronics) measures the phase and magnitude of the variation. It uses these to estimate the offset of the coning center and thereby to drive a correction to the beam aiming. The advantage of an embodiment that uses retroreflectors is that no sensors and/or control electronics are required on or proximate to the energy receiving device, or the vehicle or apparatus being powered. Furthermore, retroreflectors are typically formed of solid chunks of material with no moving parts, so reliability is high and power consumption is zero.

Figure 15:
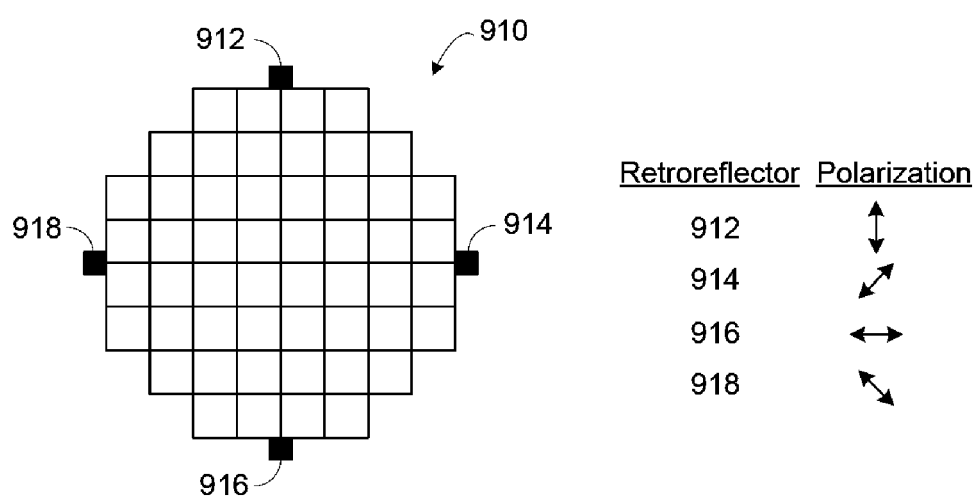
FIG. 15 is a schematic plan view depicting an energy receiving device in accordance with an embodiment.

Like coning modulation, polarizing modulation can use retroreflectors (e.g., 814-816 of FIG. 14) rather than actual sensors. However, the retroreflectors must each have polarizing optics so light with the proper polarization is most strongly reflected. The polarization of each retroreflector must be unique, and ideally the polarization directions should be distributed to give maximal isolation of each retroreflector from all other retroreflectors. For example, FIG. 15 depicts an energy receiving device 910 including four retroreflectors 912-918 and the polarization corresponding to each. Light sensors at each energy beam source (e.g., 802-804 of FIG. 14), for example, sense the reflected light through a telescope. The sensors can use optics and/or control electronics to match the modulation frequency of each source, thereby excluding the reflected signal from other energy beam sources.

The BeamNet Architecture: The BeamNet architecture, as described in co-pending, commonly-owned U.S. patent application Ser. No. 11/420,086, filed May 24, 2006, enables many energy beam sources and many energy receiving devices to interoperate in a complex system of systems. In the long run, there will likely be many more energy beam sources in the world than the number of convenient, orthogonal modulation patterns. Therefore, means are typically included for each energy receiving device (or receiving element) to assign a modulation pattern to each source as each energy beam source initiates a link with the receiving element. This modulation pattern need only be unique within the set of beams that are currently incident to a particular energy receiving device. Thus, the energy receiving device needs only to keep track of what modulation patterns it can sense and which of those are already assigned to energy beam sources. When a source releases a link with a particular energy receiving device, that receiver notes that energy beam's modulation pattern as unassigned. It is then available to be assigned to another energy beam sources that links with the energy receiving device.

Likewise, each energy beam source is able to receive modulation pattern assignments from an energy receiving device (by way of control electronics, etc.) and implement the assigned pattern when it aims an energy beam at the energy receiving device. The present invention contemplates application and use within the context of the BeamNet Architecture, as well as other operational systems and embodiments.

Figure 16:
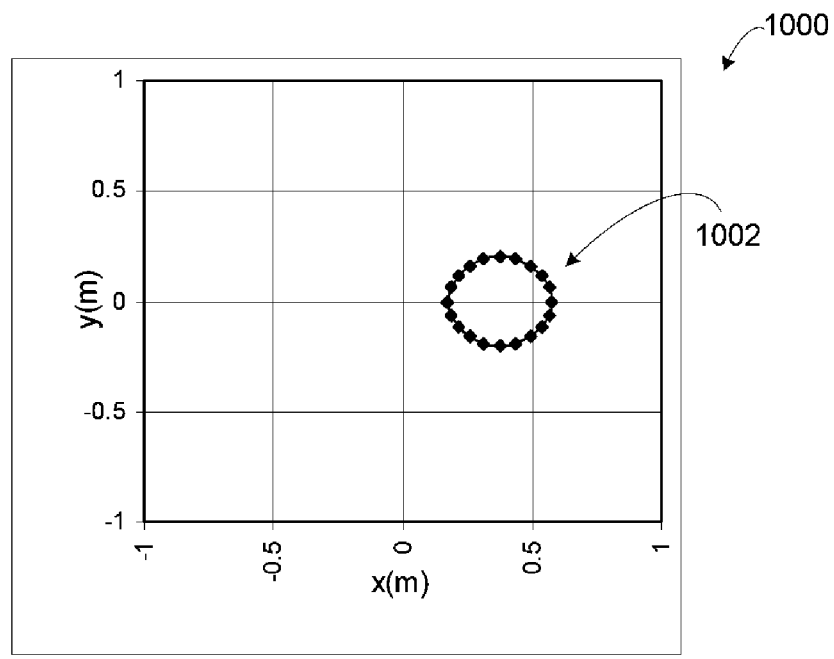
FIG. 16 is a data plot depicting simulated operating conditions in accordance with an embodiment.

Simulation Modeling: A software simulation has been used to verify the approach to coning modulation. FIG. 16 shows an X-Y plot 1000 of simulated discrete energy beam center positions 1002 on a two meter by two meter energy receiving device. As depicted, the energy beam centers are plotted at 10 millisecond intervals. Thus, FIG. 16 represents coning modulation with a cyclic period of 160 milliseconds and a coning radius of 0.2 meters. Cyclic motion is understood to be clockwise as seen by the viewer. While FIG. 16 does not depict any sensors (or retroreflectors), it is assumed for purposes of ongoing example that a total of four sensors are used distributed about the simulated energy receiving device. Please refer to sensors 312-318 of FIG. 5. In the following discussion, these four sensors (not shown) will be referred to as Top, Right, Bottom and Left, respectively. It is further assumed that the simulated beam is Gaussian in energy distribution wherein σ=1.0 meter.

Figure 17:
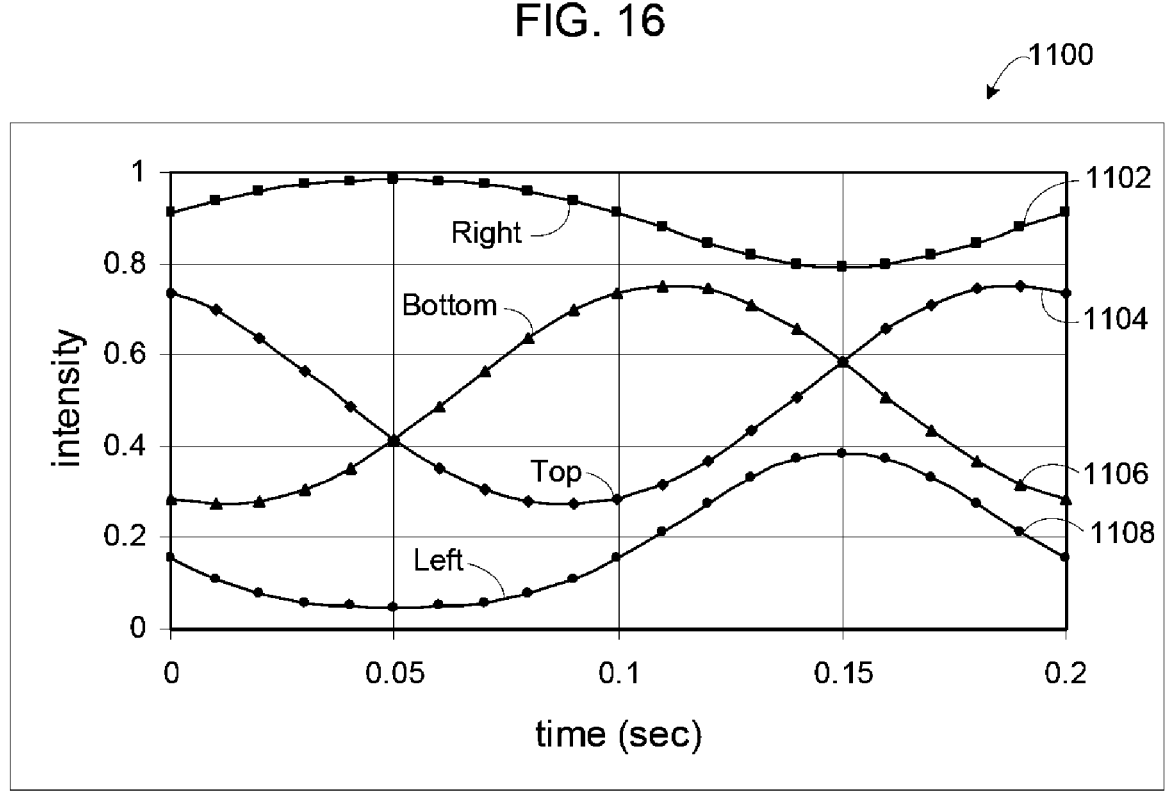
FIG. 17 is a data plot corresponding to FIG. 16.

Reference is now directed to FIG. 17, which depicts an intensity-over-time plot 1100 of simulated energy intensity measurements corresponding to FIG. 16. The plot 1100 includes four data series respectively corresponding to the four sensors (not shown) of the data of FIG. 16 as follows: series 1102=Right sensor; series 1104=Top sensor; 1106=Bottom sensor; and 1108=Left sensor. The data series 1104 (i.e., Top sensor) of the simulation was input to a Fast Fourier Transform (FFT), which derived the data plot 1200 of FIG. 18.

Figure 18:
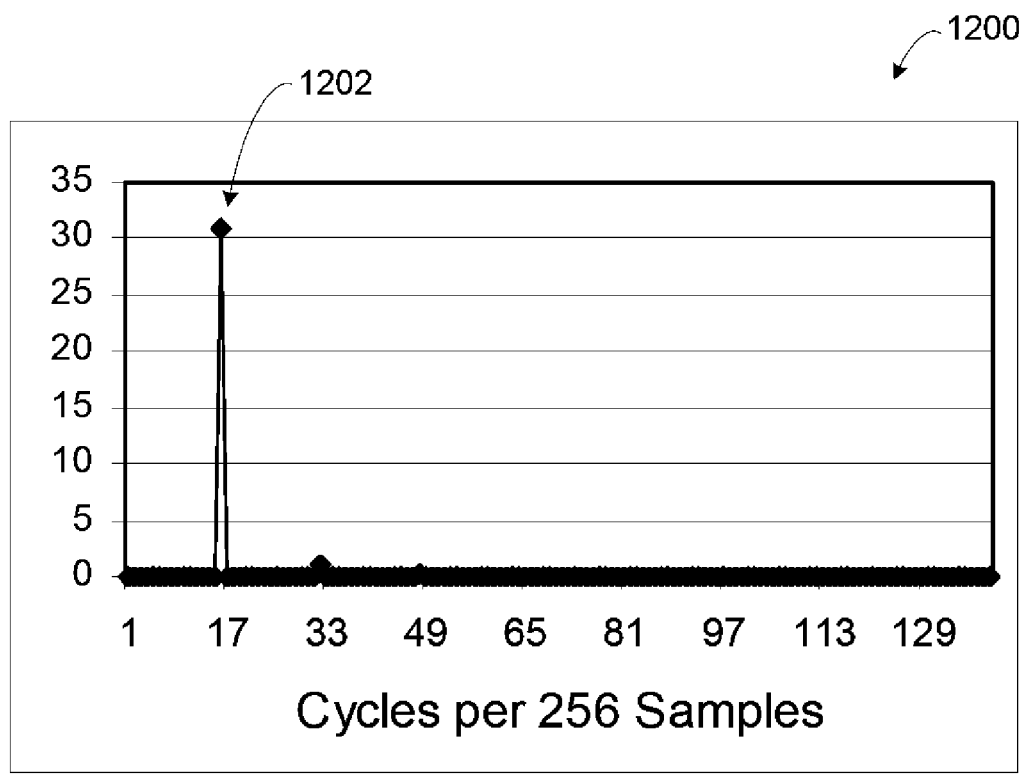
FIG. 18 is a data plot corresponding to FIGS. 16 and 17.

FIG. 18 depicts a plot 1200 of the FFT results for the simulated energy intensity measurements of FIGS. 16 and 17. The plot 1200 includes a spike 1202 in the data corresponding to a frequency of 16 cycles in 256 samples—exactly what is expected when considering a coning period of 160 milliseconds with a 10-millisecond sample interval. This is the frequency at which the transfer function for this energy beam measures the amplitude and phase of intensity variation for each sensor. Other energy beams—not included in this simulation—include coning modulation at different rates and therefore would yield FFT spikes at respectively different frequencies.

The amplitudes and phases for all four simulated sensors (data series 1102-1108 of FIG. 17) at this same coning frequency are calculated by the simulation, and are presented in Table 2 below:

TABLE 2

|  | Top Sensor | Right S. | Bottom S. | Left S. |
|---|---|---|---|---|
| Amplitude | 30.996 | 12.287 | 30.996 | 21.580 |
| Phase (deg.) | 20.56 | −90 | 159.44 | 90 |

Table 2 above provides that the amplitude is largest for the Top sensor and Bottom sensor (data series 1104 and 1106 of FIG. 17), which are at the steepest part of the curve for the simulated energy beam pattern. Therefore, each of sensors Top and Bottom measures the largest fluctuations for small motions of the simulated energy beam. More importantly, the phase of the amplitude peak for each sensor is exactly as we expect: the Top sensor leads the beginning of the cycle by:

$$\tan^{-1}(0.375 \text{ meter}/1 \text{ meter})=20.556 \text{ deg.} \quad \text{(Eq. 12)}$$

The Right sensor (data series 1102 of FIG. 17) lags the beginning of the cycle by 90 degrees. The Bottom sensor (data series 1106 of FIG. 17) leads the cycle by 159.44 degrees (or, equivalently, lags the cycle by 200.56 degrees). The Left sensor (data series 1108 of FIG. 17) leads by 90 degrees (equivalent to lagging by 270 degrees). Using these simulated values to derive feedback to an energy beam source, the source would be able to correctly deduce the current location of the coning center by triangulation from the four sensors.

The simulated results discussed above in regard to FIGS. 16-18 above are for an ideal case—one where the energy beam is centered exactly where the corresponding source's control system intends to point it. However, the present teachings also work in the presence of noise. The same data sets are now considered, but with the addition of 0.05 meter Gaussian random steering jitter in the X and Y position of the beam.

Figure 19:
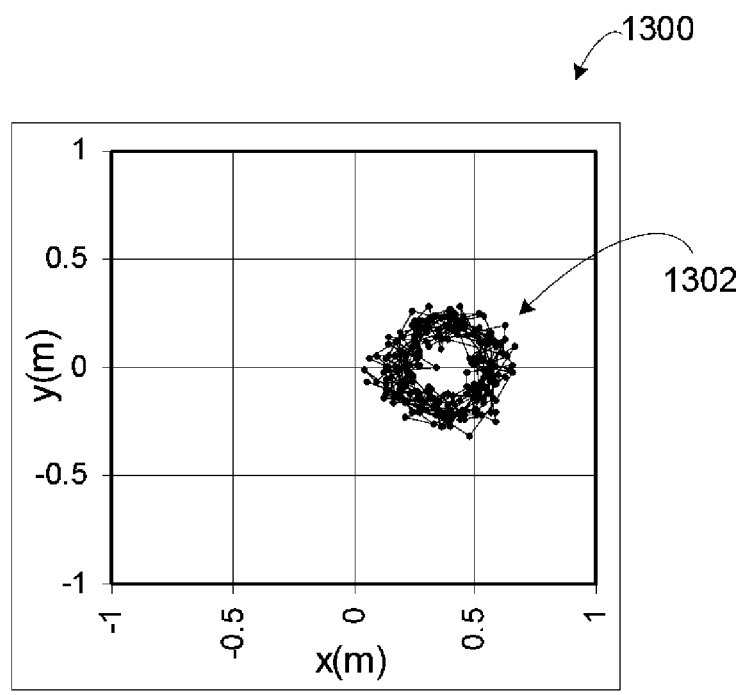
FIG. 19 is a data plot depicting simulated operating conditions in accordance with another embodiment.
Figure 20:
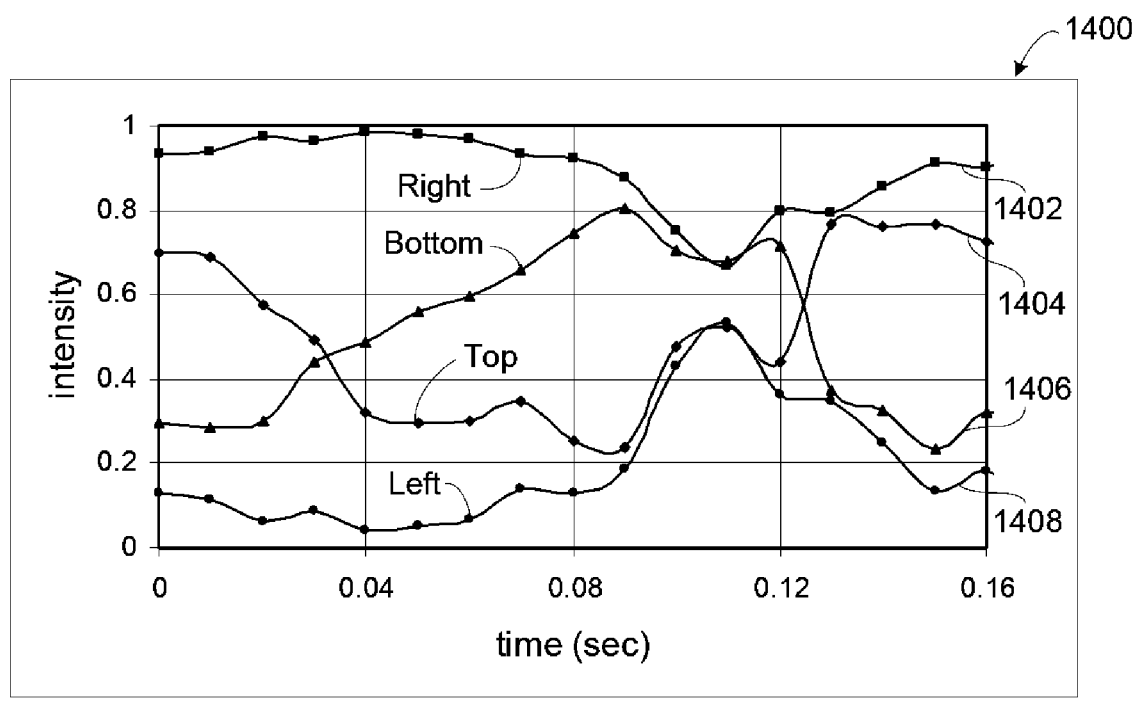
FIG. 20 is a data plot corresponding to FIG. 19.
Figure 21:
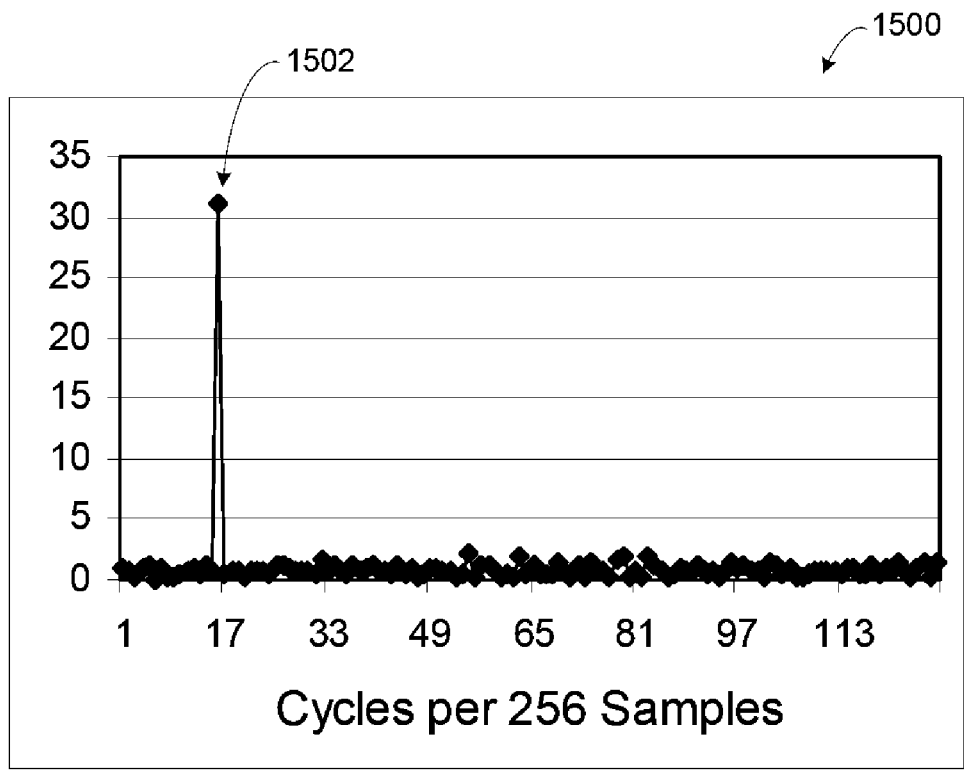
FIG. 21 is a data plot corresponding to FIGS. 19 and 20.

FIG. 19 depicts a plot 1300 of simulated energy beam's positions 1302 over 16 coning cycles including Gaussian random jitter. In turn, FIG. 20 depicts an intensity-over-time plot 1400 of simulated energy intensity measurements corresponding to FIG. 19 over one coning cycle. The plot 1400 includes four data series 1402, 1404, 1406 and 1408 respectively corresponding to the Right, Top, Bottom and Left sensors (not shown) as considered above. Subjecting the data series 1404 (i.e., Top sensor) of the 16-cycle simulation to a FFT resulted in the data plot 1500 of FIG. 21. Despite the distorted patterns for each sensor (data series 1402-1408), the overall frequency response shown in FIG. 21 is still quite specific to the selected coning frequency. Thus, FFT techniques work well even with data (i.e., position detection signals) including notable jitter.

Table 3 below indicates that even with jitter noise present in the foregoing example, phase angles for three of the sensors are within 0.3 degrees of the correct value, and the phase angle for the other sensor is off by only 2.48 degrees. Even if the worst phase value were used, the error in locating the coning center is only 4.33 centimeters on an energy receiving device two meters-by-two meters in size. This error is easily tolerable and is a great improvement over the 0.375 meter (37.5 centimeters) offset of the coning center assumed in the simulation.

TABLE 3

|  | Top Sensor | Right S. | Bottom S. | Left S. |
|---|---|---|---|---|
| Amplitude | 31.193 | 12.442 | 30.856 | 21.380 |
| Phase (deg.) | 22.26 | −89.93 | 161.92 | 89.99 |

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. A system, comprising:
a receiving assembly including a target area configured to receive incident electromagnetic energy and to convert the incident electromagnetic energy into an electrical or thermal output, wherein the incident electromagnetic energy includes a contribution from a plurality of energy sources, each of the plurality of energy sources having a uniquely modulated energy beam, wherein the receiving assembly is included on a moving vehicle, and wherein each contribution from the plurality of energy sources comprises at least one of an amplitude modulated contribution, a polarization modulated contribution, or a coning modulated contribution; and
a control assembly including:
a plurality of sensors disposed around the target area, each sensor being configured to receive a portion of electromagnetic energy not incident on the target area and to provide a corresponding output signal; and
a processing device operatively coupled to the plurality of sensors and configured to:
analyze the output signals from the plurality of sensors to distinguish between the contribution of electromagnetic energy received from each of the plurality of energy sources and resolve a location relative to the target area of the electromagnetic energy incident to the plurality of sensors from each of the plurality of energy sources;
detect a misalignment of the contribution from at least one of the plurality of energy sources; and
provide at least one control signal to at least one misaligned energy source tending to correct the misalignment.

2. The system of claim 1, wherein the processing device is configured to detect the misalignment of the contribution by analyzing the at least one of the amplitude modulated contribution, the polarization modulated contribution, and the coning modulated contribution.

3. The system of claim 2, wherein the processing device is further configured to analyze the output signals from the plurality of sensors by way of a Fourier transform.

4. The system of claim 1, wherein the plurality of energy sources includes at least one of a laser beam emitter and a microwave beam emitter.

5. The system of claim 1, wherein the receiving assembly includes one or more photovoltaic cells.

6. A system, comprising:
an energy receiving device configured to convert incident electromagnetic energy into electrical or thermal energy, wherein the energy receiving device is included on a moving vehicle;
a plurality of sources configured to emit respective energy beams, wherein each of the respective energy beams is emitted according to an individual modulation pattern, wherein the respective energy beams include at least one of an amplitude modulated energy beam, a polarization modulated energy beam, or a coning modulated energy beam;
a plurality of sensors disposed around the energy receiving device configured to provide respective detection signals corresponding to one or more of the energy beams incident to the energy receiving device; and
a controller configured to:
receive the detection signals,
distinguish between the individual modulation pattern of each energy beam,
resolve a location for each of the energy beams, the location being relative to the energy receiving device of the electromagnetic energy and incident to the plurality of sensors, and
provide one or more control signals, wherein the plurality of sources are further configured to controllably aim the respective energy beams at the energy receiving device in accordance with the one or more control.

7. The system of claim 6, wherein the controller is further configured to distinguish individual energy beam modulation patterns within the respective detection signals by way of a Fourier transform.

8. The system of claim 6, wherein the energy receiving device includes one or more photovoltaic cells.

9. The system of claim 6, wherein at least one of the plurality of sources includes a laser.

10. The system of claim 6, further comprising one or more reflectors configured to reflect a portion of the one or more energy beams incident to the energy receiving device.

11. The system of claim 10, further comprising a telescope, wherein one or more of the plurality of sensors receives the reflected portion of the one or more energy beams by way of the telescope.

12. The system of claim 6, wherein:
the controller is further configured to distinguish magnitude and phase variations within the detection signals; and
the plurality of sources are further configured to controllably modulate respective energy beams in accordance with the one or more control signals.

13. A method of providing energy to a moving vehicle from uniquely modulated energy beams that are located separate from the moving vehicle, the method comprising:
simultaneously controllably aiming a plurality of the uniquely modulated energy beams at an energy receiving device, the energy receiving device including a plurality of sensors disposed around a target area, wherein the uniquely modulated energy beams include at least one of an amplitude modulated energy beam, a polarization modulated energy beam, or a coning modulated energy beam;
sensing, via the plurality of sensors, a misalignment of at least one of the uniquely modulated energy beams with respect to the energy receiving device by resolving a location relative to the target area of the electromagnetic energy incident to the plurality of sensors from each of the plurality of energy sources;

distinguishing individual energy beam modulation patterns in accordance with sensing the misalignment of at least one of the modulated energy beams;

adjusting the aiming of the at least one modulated energy beam in response to the sensing and based in part on the distinguishing; and converting at least a portion of the uniquely modulated energy beams incident to the energy receiving device into electrical or thermal energy.

14. The method of claim 13, wherein the sensing is performed in accordance with a Fourier transform.

15. The method of claim 13, further comprising distinguishing at least one of amplitude modulation patterns and polarization modulation patterns in accordance with the sensing.

16. The method of claim 13, further comprising distinguishing individual energy beam coning modulation patterns in accordance with the sensing.

* * * * *